(12) United States Patent
Subotincic

(10) Patent No.: US 8,240,726 B2
(45) Date of Patent: *Aug. 14, 2012

(54) END EFFECTOR WITH MULTIPLE PICK-UP MEMBERS

(76) Inventor: Milos Misha Subotincic, Etobicoke (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/214,828

(22) Filed: Jun. 23, 2008

(65) Prior Publication Data
US 2009/0066098 A1 Mar. 12, 2009

Related U.S. Application Data

(63) Continuation of application No. 10/420,075, filed on Apr. 22, 2003, now Pat. No. 7,390,040.

(60) Provisional application No. 60/374,408, filed on Apr. 22, 2002.

(51) Int. Cl.
*A47B 97/00* (2006.01)

(52) U.S. Cl. ...... 294/65; 294/87.1; 198/468.3; 414/627; 414/737

(58) Field of Classification Search ............ 414/416.02, 414/749.5, 783, 752.1, 737, 668, 667, 666, 414/658, 627, 226.01, 225.01, 900; 294/87.12, 294/87.1, 65; 198/468.3; 901/40
See application file for complete search history.

(56) References Cited

U.S. PATENT DOCUMENTS

| | | | |
|---|---|---|---|
| 2,366,238 A | 1/1945 | Clausen | |
| 3,934,920 A | 1/1976 | Rowekamp | |
| 3,973,795 A | 8/1976 | Goransson | |
| 4,199,050 A * | 4/1980 | Moller | 198/429 |
| 4,370,092 A | 1/1983 | Healy | |
| 4,444,423 A | 4/1984 | Montferme et al. | |
| 4,444,424 A | 4/1984 | Lebret | |
| 4,810,154 A | 3/1989 | Klemmer et al. | |
| 4,832,180 A | 5/1989 | Ferrero | |
| 4,976,582 A | 12/1990 | Clavel | |
| 4,987,676 A | 1/1991 | Amorosi | |
| 5,019,112 A | 5/1991 | Engelhardt et al. | |

(Continued)

FOREIGN PATENT DOCUMENTS

CA 2426057 A1 10/2003

(Continued)

OTHER PUBLICATIONS

Wikipedia webpage for "Scotch yoke" (3 pages), http://en.wikipedia.org/wiki/Scotch_yoke (extracted Apr. 19, 2011).

(Continued)

*Primary Examiner* — Scott Lowe
(74) *Attorney, Agent, or Firm* — Smart & Biggar

(57) ABSTRACT

An end effector for use with a moving device has a frame and a plurality of operational members mounted for movement on the frame. The effector also has an actuation mechanism directly connected to a first operational member and is operable to move the first operational member from a first position to a second position, and from the second position to the first position. A linking apparatus is provided for linking the first operational member to a second operational member. The actuation mechanism moves the first operational member from the first position to the second position, and results in the second operational member being moved by the linking apparatus from a third position to a fourth position. The operational members can be pick up members for picking up items at one pitch and releasing them at a second pitch.

45 Claims, 19 Drawing Sheets

U.S. PATENT DOCUMENTS

| | | | |
|---|---|---|---|
| 5,040,056 A | 8/1991 | Sager et al. | |
| 5,060,455 A | 10/1991 | Schmeisser | |
| 5,149,162 A | 9/1992 | Focke et al. | |
| 5,263,378 A | 11/1993 | Loomer | |
| 5,316,041 A | 5/1994 | Ramacier, Jr. et al. | |
| 5,344,202 A | 9/1994 | Ramler et al. | |
| 5,494,074 A | 2/1996 | Ramacier, Jr. et al. | |
| 5,502,944 A | 4/1996 | Kraft et al. | |
| 5,575,376 A | 11/1996 | Colamussi | |
| 5,632,590 A | 5/1997 | Pearson et al. | |
| 5,639,203 A | 6/1997 | Lee | |
| 5,655,355 A | 8/1997 | Ramler | |
| 5,664,322 A | 9/1997 | Best | |
| 5,664,931 A | 9/1997 | Brugger et al. | |
| 5,727,832 A | 3/1998 | Holter | |
| 5,839,769 A | 11/1998 | Slocum et al. | |
| 5,899,658 A | 5/1999 | Hofmeister | |
| 5,931,279 A | 8/1999 | Pedrotto et al. | |
| 5,984,623 A | 11/1999 | Smith et al. | |
| 6,068,317 A * | 5/2000 | Park | 294/87.1 |
| 6,201,203 B1 | 3/2001 | Tilles | |
| 6,217,093 B1 | 4/2001 | Neutel et al. | |
| 6,220,424 B1 | 4/2001 | Fluck | |
| 6,286,290 B1 | 9/2001 | Fluck | |
| 6,309,001 B1 | 10/2001 | Sherwin et al. | |
| 6,357,125 B1 | 3/2002 | Feldmann et al. | |
| 6,357,994 B1 | 3/2002 | St. Onge | |
| 6,374,996 B1 | 4/2002 | Hsieh | |
| 6,439,631 B1 | 8/2002 | Kress | |
| 2002/0053134 A1 | 5/2002 | Hidese | |

FOREIGN PATENT DOCUMENTS

| | | |
|---|---|---|
| DE | 19831181 | 3/2000 |

OTHER PUBLICATIONS

Wikipedia webpage for "Bourke engine" (5 pages), http://en.wikipedia.org/wiki/Bourke_engine (extracted Apr. 19, 2011).

Webpage for Propack, Processing and Packaging Systems Inc. re: history of company and LJ 500 model (1 page), http://www.propack.on.ca/index-4.html (extracted Apr. 26, 2011).

Reuleaux, F. (translated by A.B.W. Kennedy), "Chapter 8: Kinematic Analysis", The Kinematics of Machinery: Outlines of a Theory of Machines, 1876, pp. 313-314 and 321.

Kepler, Harold B., "Chapter 1: Introduction and Chapter 7: Accerlations in Mechanisms", Basic Graphical Kinematics, 1960, p. 7 (Fig. 1-7), p. 183 (Fig. 7-13) and p. 184.

Conformed Documents for Service (17 pages) dated Dec. 21, 2010, Case No. SACV 10-1946 AG (PJWx).

Unexecuted Complaint as Filed Dec. 21, 2010 (16 pages), *Milos Misha Subotincic and Subo Automation Inc.* vs. *1274274 Ontario Inc. C.O.B. as Propack Processing & Packaging Systems Inc.*; Chris Follows; and Does 1 Through 10, United States District Court, Central District of California.

Answer and Affirmative Defenses by: 1) Propack Processing and Packaging Systems, Inc.; and 2) Chris Follows, Filed Mar. 10, 2011, Case SA CV 10-1946 AG (PJWx), United States District Court, Central District of California.

Applicant's own device for use in a non-robotic unrelated application to strip tampons into a bucket conveyor dated on or about Feb. 24, 1997 (1 page).

Screen shots from Wolfram Demonstrations Project website (3 pages), http://demonstrations.wolfram.com/ComparingSimpleCrankSliderAndScotchYokeMechanisms/ (extracted Jul. 22, 2011).

Subotincic, Misha; Flex-Picker Spreading Tool—Preliminary Drawing (Marked as "SUBO I"), 2001.

Subotincic, Misha; Flex-Picker Spreading Tool—Preliminary Drawing (Marked as "SUBO II"), 2001.

Subotincic, Misha; Flex-Picker Spreading Tool—Preliminary Drawing (Marked as "SUBO III"), 2001.

Subotincic, Misha; Email to Chris Follows with subject reference "Flexpicker tooling proposal" (Marked as "SUBO IV"), dated Mar. 7, 2001 with 2 pages of attachments (redacted).

Subotincic, Misha; Email to Doug Weber with subject reference "Pneumatic Version" (Marked as "SUBO V"), dated Mar. 19, 2001 with 1 page attachment (redacted).

Subotincic, Misha; Email to Doug Weber (Marked as "SUBO VI"), dated Mar. 29, 2001 with 1 page attachment (redacted).

Subotincic, Misha; Email to Doug Weber with subject reference "End Effector Approval" to (Marked as "SUBO VII"), dated May 2, 2001 with 2 pages of attachments (redacted).

Canadian Intellectual Property Office Examiner's Report Issued Jan. 19, 2010 for Canadian Patent Application No. 2,426,057.

Canadian Intellectual Property Office Examiner's Report Issued Dec. 22, 2010 for Canadian Patent Application No. 2,426,057.

Canadian Intellectual Property Office Examiner's Report Issued Feb. 20, 2012 for Canadian Patent Application No. 2,426,057.

Defendants' Preliminary Invalidity Contentions (35 pages), Filed Jul. 18, 2011, Case SA CV 10-1946 AG (PJWx), United States District Court Central District of California.

* cited by examiner

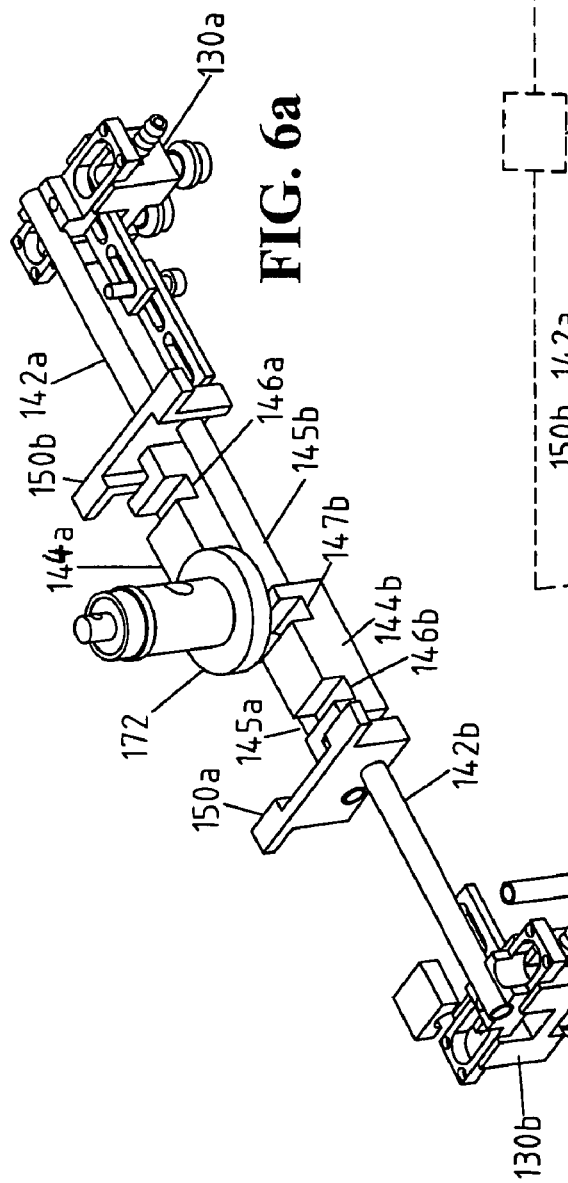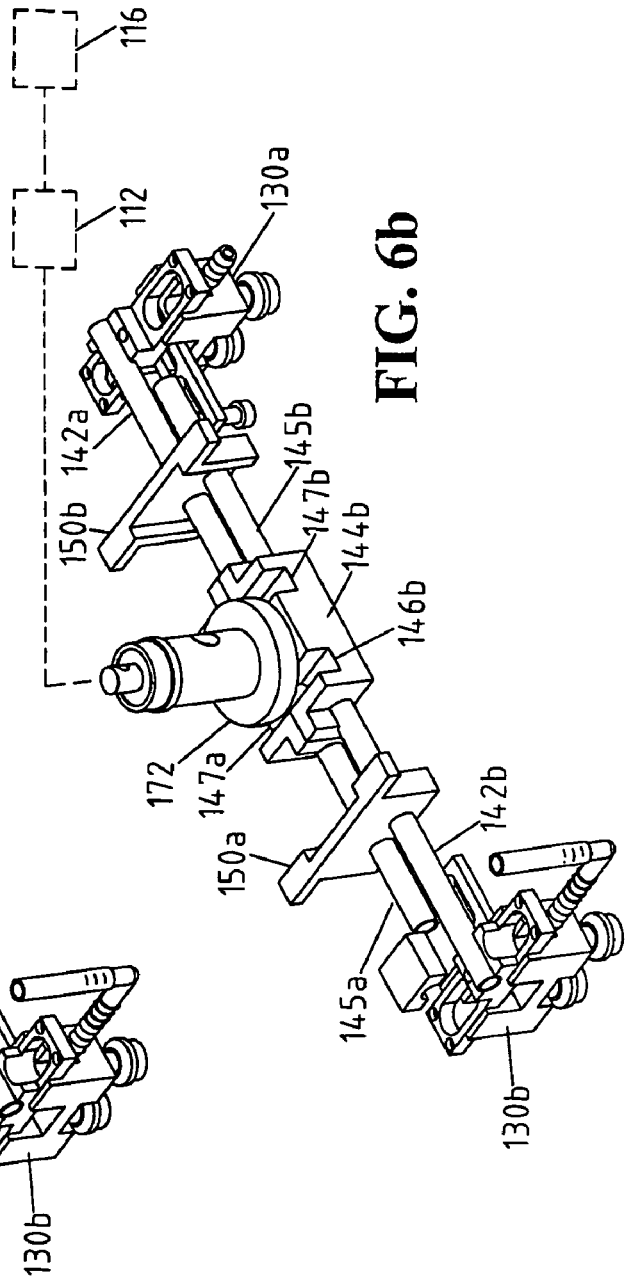

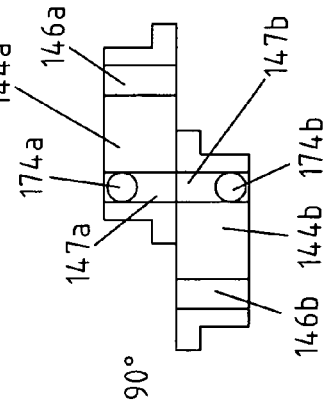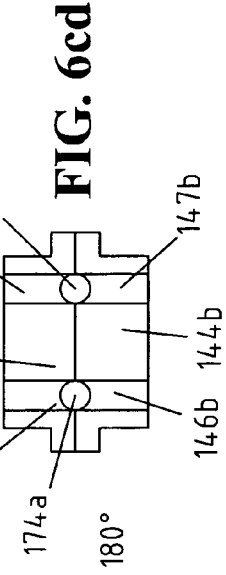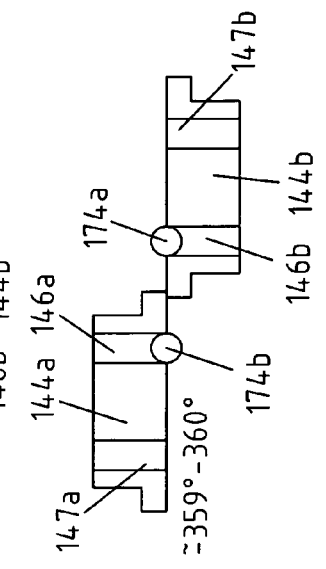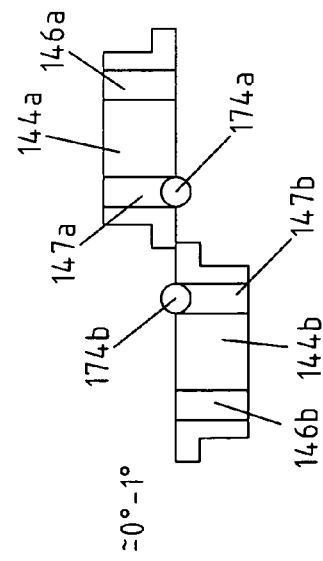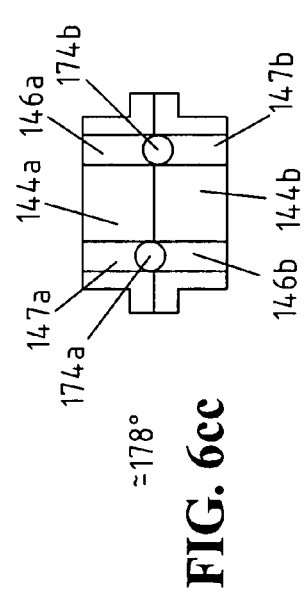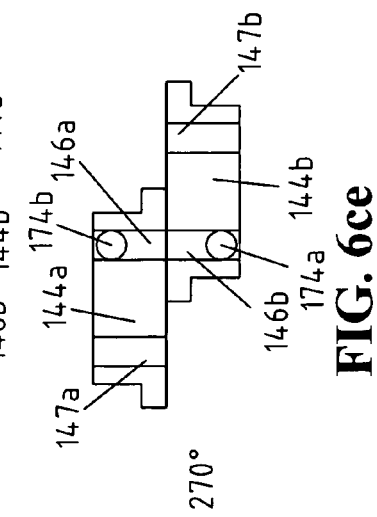

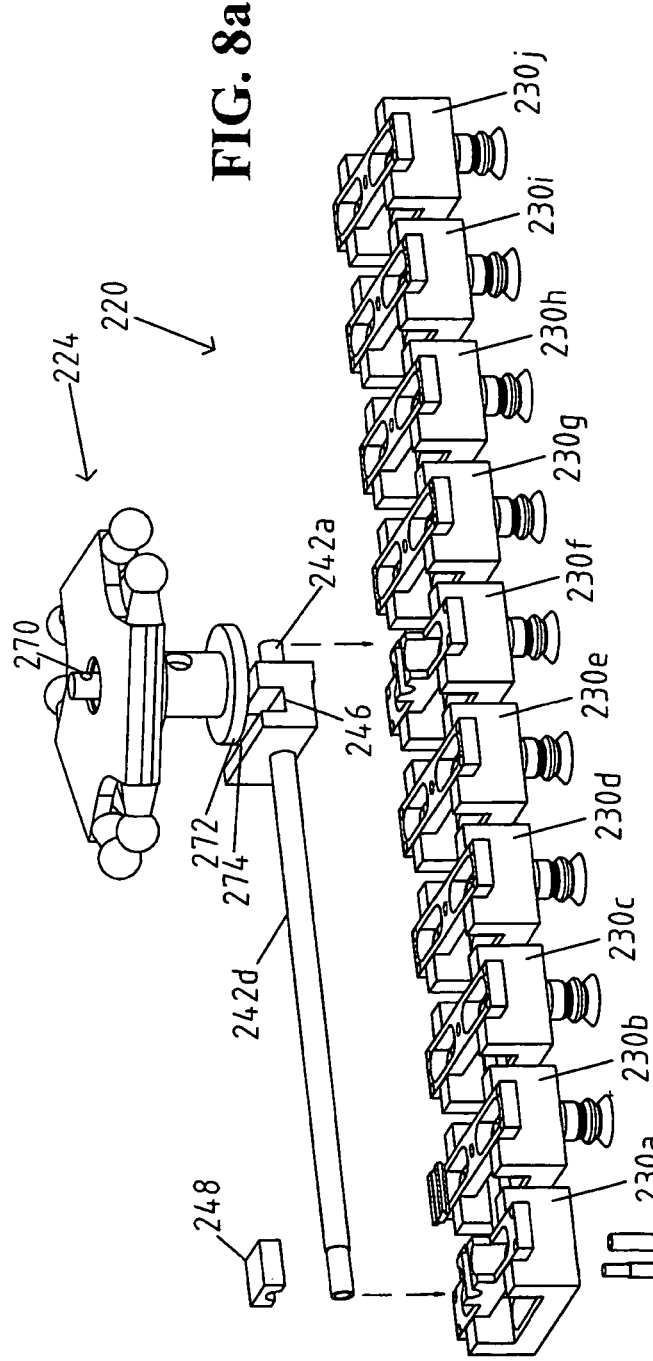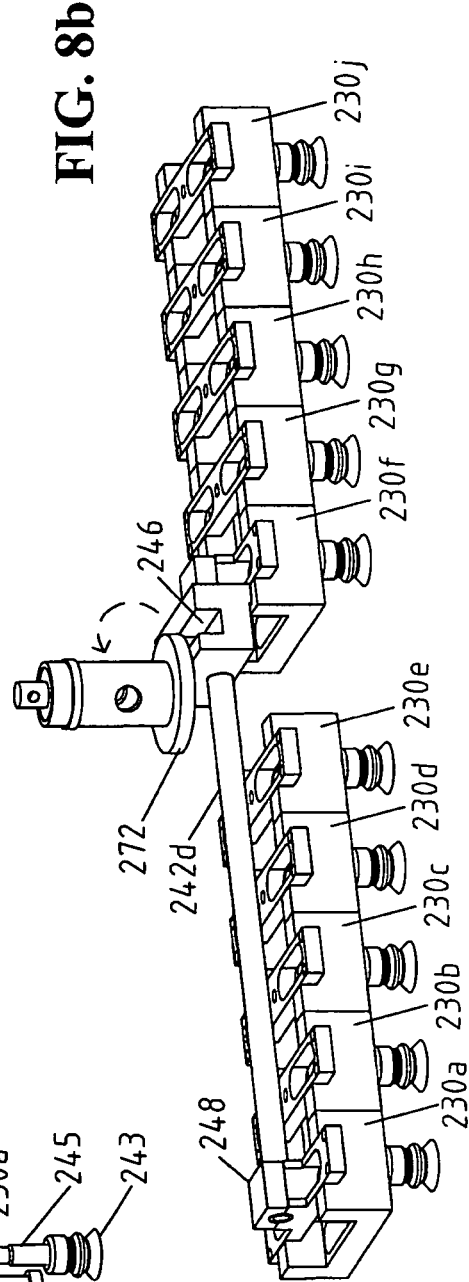

END EFFECTOR WITH MULTIPLE PICK-UP MEMBERS

CROSS REFERENCE TO RELATED APPLICATIONS

This is a continuation application of U.S. patent application Ser. No. 10/420,075 filed Apr. 22, 2003, which is related to U.S. Provisional patent application Ser. No. 60/374,408 filed Apr. 22, 2002, the entire contents of both applications being hereby incorporated herein by reference.

FIELD OF THE INVENTION

The present invention relates to end-effectors for use with devices such as robotic arms.

BACKGROUND OF THE INVENTION

End-effectors attached to devices such as robotic arms are well known. These end-effectors often have operational members that perform operations on items. One common type of operational members are pick-up members which can be used to pick up, move and release items.

The use of devices as such as robotic arms with end effectors, that can perform operations on items, is also well known in various industries, such as for example, in the packaging industry. Such robotic arms use a variety of end effectors, for example, to move items from an article feed conveyor into open receptacles such as for example, cardboard boxes. Advantageously, robotic arms and their end-effectors can be moved through a wide range of orientations and positions in a three-dimensional space. One example of the use of a robotic arm and end effector to package items is disclosed in U.S. Pat. No. 5,060,455 ("Robotic Case Packaging System and Method"), the contents of which are hereby incorporated by reference.

Robotic arms are traditionally constructed as a cascade of several joined sections, each of which can be rotated and translated in a three-dimensional space so as to achieve a desired position of the end section of the robotic arm, and thus achieve a desired position and orientation in the three-dimensional space for the end effector attached to the end section of the robotic arm. Disadvantageously, because several different sections of traditional robotic arms have to be separately controlled, such robotic arms are very slow, and therefore not particularly well suited for use with high rate packaging systems. However, a more recent robotic arm that can move at very high speeds is the robotic arm disclosed in U.S. Pat. No. 4,976,582 ("Device for the Movement and Positioning of an Element in Space"), the contents of which are hereby incorporated by reference. This robotic arm, sometimes referred to as a "Delta" robot or a "Spider" robot uses three independent and non-joined control arms extending from a base element and attached to a movable element to position and orient the movable element in three-dimensional space. An end effector is attached to the movable element. Preferably, the end effector can be rotated about its center by connecting a rotatable shaft that is connected to a motor preferably positioned at the base element of the Delta robot. Advantageously, this design allows the movable element to be moved at accelerations ranging between 12 G to 50 G.

Because of the high speeds at which Delta robots can move, Delta robots have been used in industry to package items. For example, a packaging system manufactured by SIG Demaurex uses a Delta robot to package various food items. This packaging system uses an end effector comprising of six pick-up members to simultaneously pick-up six items. Gripping of the items in the packaging system is usually achieved by suction cups on the end effector which grip one or more items. The suction is applied to the cups through the use of a vacuum system. Once the end effector attached to the movable element in the Delta robot has picked up the items, the end effector is moved to a position proximate a receptacle at some desired position relative to the rest of the packaging system. At this release position the items can be deposited into the receptacle.

Advantageously, the positions of the pick-up members on the end effector can be adjusted so that the pick-up members can pick-up several items at the same time, that are far apart from each other. Subsequently the items held by the end-effector can be converged, by moving the pick-up members toward each other, thus bringing the items closer to each other. Having adjusted the spacing of the items, they can be deposited into a single receptacle in a more closely packed configuration.

Known designs of end effectors for simultaneous transport of a number of items use pneumatic rods, or equivalent actuation mechanism, that are attached to each one of the pick-up members on the end effector to control the positions of those pick-up members on the end effector. One of the main problems with such end effector designs is the high complexity involved in individually controlling the position of the pick-up members. Additionally, the physical size of each actuation device places constraints on the maximum number of actuation devices that can be combined to form the actuation mechanism of an end effector.

Another problem with the use of Delta robots to package items is the limitation of the load weight that can be carried by the end effector due to the high speeds at which the movable element, and the end effector attached to it, move. A heavy weight load would necessarily reduce the maximum acceleration that can be obtained for the movable element and the end effector. Thus, one of the important considerations in the design and use of an end effector is the weight of the end effector. The lower the weight of the end effector, the more weight that can then be picked-up by the end effector for transport to a receptacle. With current designs of end effectors for simultaneous transport of multiple items, the use of separate pneumatic rods to control individual pick-up member adds considerable weight to the overall weight of the end effector. This reduces the total weight that can be picked-up by the end effector for transporting an article to a receptacle.

It would therefore be desirable to have a lighter weight end effector, that uses a less complex and cumbersome actuation mechanism to control the positions of the pick-up members on the end effector.

It is also desirable to be able have an end effector which can perform a first operation on a group of several items spaced at a first pitch and then group those items into at least two groups, each item in the two groups being at a second pitch, and perform a second operation on the items in both groups at the same time.

SUMMARY OF INVENTION

It is therefore desirable to provide for an end effector consisting of multiple pick-up members for transporting items from one location to another location, which uses a simple actuation mechanism to control the positions of the pick-up members on the end effector. It is also desired to be able to economize on the weight requirements of the actuation mechanism of the end effector so as to allow the end effector to pick-up and transport a larger number of items at high speeds.

In one aspect of the invention there is provided an end effector for use with a moving device, the end effector comprising: a) a frame; b) a plurality of operational members mounted for movement on the frame; c) an actuation mechanism directly connected to a first operational member of the plurality of operational members and operable to move the first operational member from a first position to a second position, and from the second position to the first position; (d) a linking apparatus for linking the first operational member to a second operational member of the plurality of operational members; wherein when the actuation mechanism moves the first operational member from the first position to the second position, the second operational member is moved by the linking apparatus from a third position to a fourth position, and when said, actuation mechanism moves said first operational member from said second position to said first position, said second operational member is moved from said fourth position to said third position.

In yet another aspect of the invention there is provided a method for lifting and transferring items from a first location to a receptacle using an end effector attached to a robot, said method comprising: a) moving said robot to position said end effector above a first batch of said items; b) actuating one of a plurality of pick-up members slidably mounted on the body of said end effector to a position directly above a first item of said first batch of said items, and using linking means connecting the remainder of said pick-up members to said one pick-up member to pull said remainder of said pick-up members to a position directly above the remainder of said first batch of said items; c) lowering said end effector so that said pick-up members can pick up said first batch of said items; d) raising said end effector; e) moving said robot to reposition said end effector above a receptacle; f) moving said one pick-up members to a converged position, and causing said remainder of said pick-up members connected to said actuated members to converge said pick up members using said linking apparatus; g) lowering said end effector toward said receptacles so that said first batch of said items are placed inside said receptacle; h) releasing said first batch of said items from said pick-up members; i) raising said end effector from above said receptacle; and j) repeating steps a-i to transfer the next batch of said items into a different receptacle.

In another aspect of the invention there is a method of carrying out operations on a plurality of items delivered at a first pitch, said method comprising: i) performing a first operation on a plurality of items, each said first operation carried out by one of a plurality of operational member spaced at a said first pitch; ii) moving said operational members to a second pitch by moving one of said plurality of operational members with an actuating mechanism, said remaining plurality of said operational members being interconnected to said one operational member; iii) performing a second operation on said plurality of items, each said second operation carried out by an operational member spaced at a second pitch.

In yet another aspect of the invention there is provided a method of carrying out operations on a plurality of items delivered at a first pitch, said method comprising: i) performing a first operation on a plurality of items, each said first operation carried out by one of a plurality of operational member spaced at a said first pitch; ii) moving said plurality of operational members to a second pitch and dividing said plurality of operational members into at least two groups; iii) performing a second operation on said plurality of items, each said second operation carried out by an operational member spaced at a second pitch.

In another aspect of the invention there is provided an end effector for use with a moving device, the end effector comprising: a) a frame having a longitudinally elongated portion; b) a plurality of operational members mounted to the elongated portion for longitudinal movement on the elongated portion; c) an actuation mechanism mounted to the frame and directly connected to a first operational member of the plurality of operational members and operable to move the first operational member longitudinally from a first position to a second position, and from the second position to the first position; d) a linking apparatus for linking longitudinally the first operational member to a second operational member of the plurality of operational members; wherein when the actuation mechanism moves the first operational member longitudinally from the first position to the second position, the second operational member is moved longitudinally by the linking apparatus from a third position to a fourth position.

In yet another aspect of the invention there is provided a robot having a robot arm with an end effector, the end effector comprising: a) a frame having a longitudinally elongated portion; b) a plurality of operational members mounted to the elongated portion for longitudinal movement on the elongated portion; c) an actuation mechanism mounted to the frame and directly connected to a first operational member of the plurality of operational members and operable to move the first operational member longitudinally from a first position to a second position, and from the second position to the first position; d) a linking apparatus for linking longitudinally the first operational member to a second operational member of the plurality of operational members; wherein when the actuation mechanism moves the first operational member longitudinally from the first position to the second position, the second operational member is moved longitudinally by the linking apparatus from a third position to a fourth position.

BRIEF DESCRIPTION OF THE DRAWINGS

In drawings illustrating by way of example only, embodiments of the invention:

FIG. 1b is a front elevation view in cross section at 1b-1b in FIG. 1a;

FIG. 1c a side elevation view in cross section at 1c-1c in FIG. 1a;

FIG. 2 is an exploded perspective view of part of the end effector of FIG. 1a;

FIG. 5b is a bottom perspective view of the end effector of FIG. 5a;

FIG. 5c is an exploded view of the end effector of FIG. 5a;

FIGS. 6a and 6b are top perspective views of parts of the end effector of FIGS. 5a-5c, which illustrate the actuation apparatus for the pick up members of the end effector of FIGS. 5a-5c;

FIGS. 6ca to 6cf (collectively "FIG. 6c") is a schematic view showing the sequence of operation of parts of the end effector of FIGS. 5a-5c;

FIGS. 8a and 8b are top perspective views of parts of the end effector of FIG. 7, which illustrate the actuation apparatus for the pick up members of the end effector of FIG. 7;

DETAILED DESCRIPTION

Figure 1A:
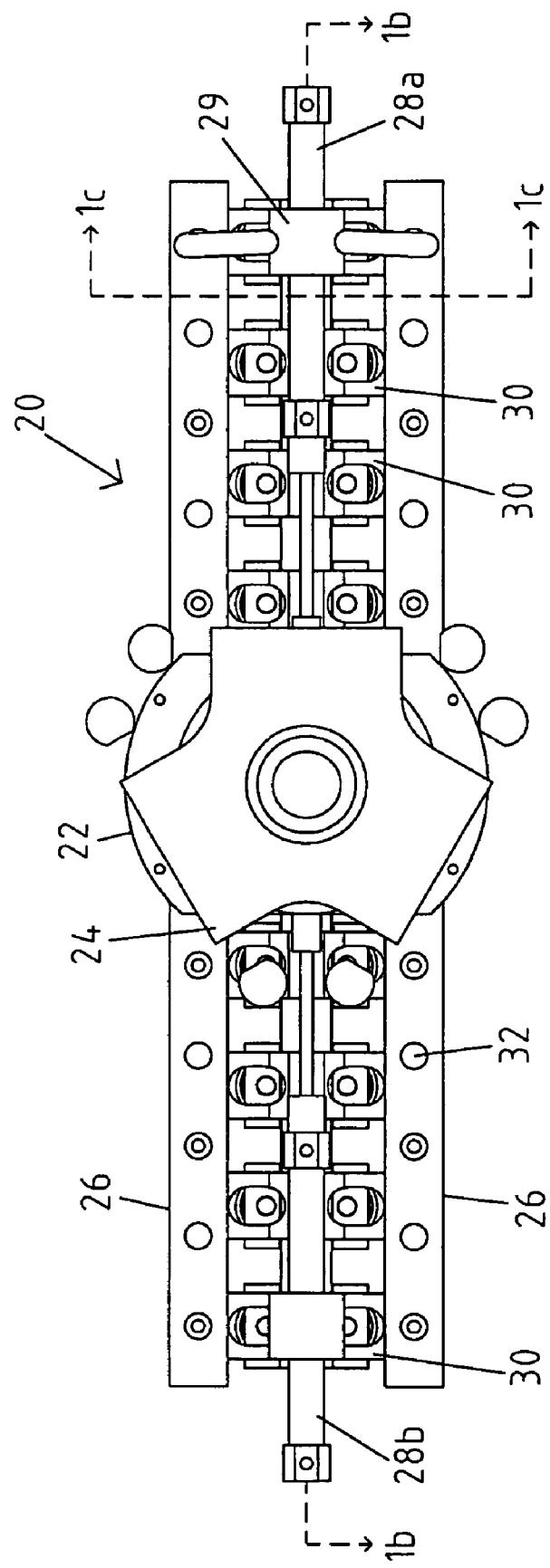
FIG. 1a is a top view of a first embodiment of the end effector of the present invention with some parts omitted for clarity.
Figure 1B:
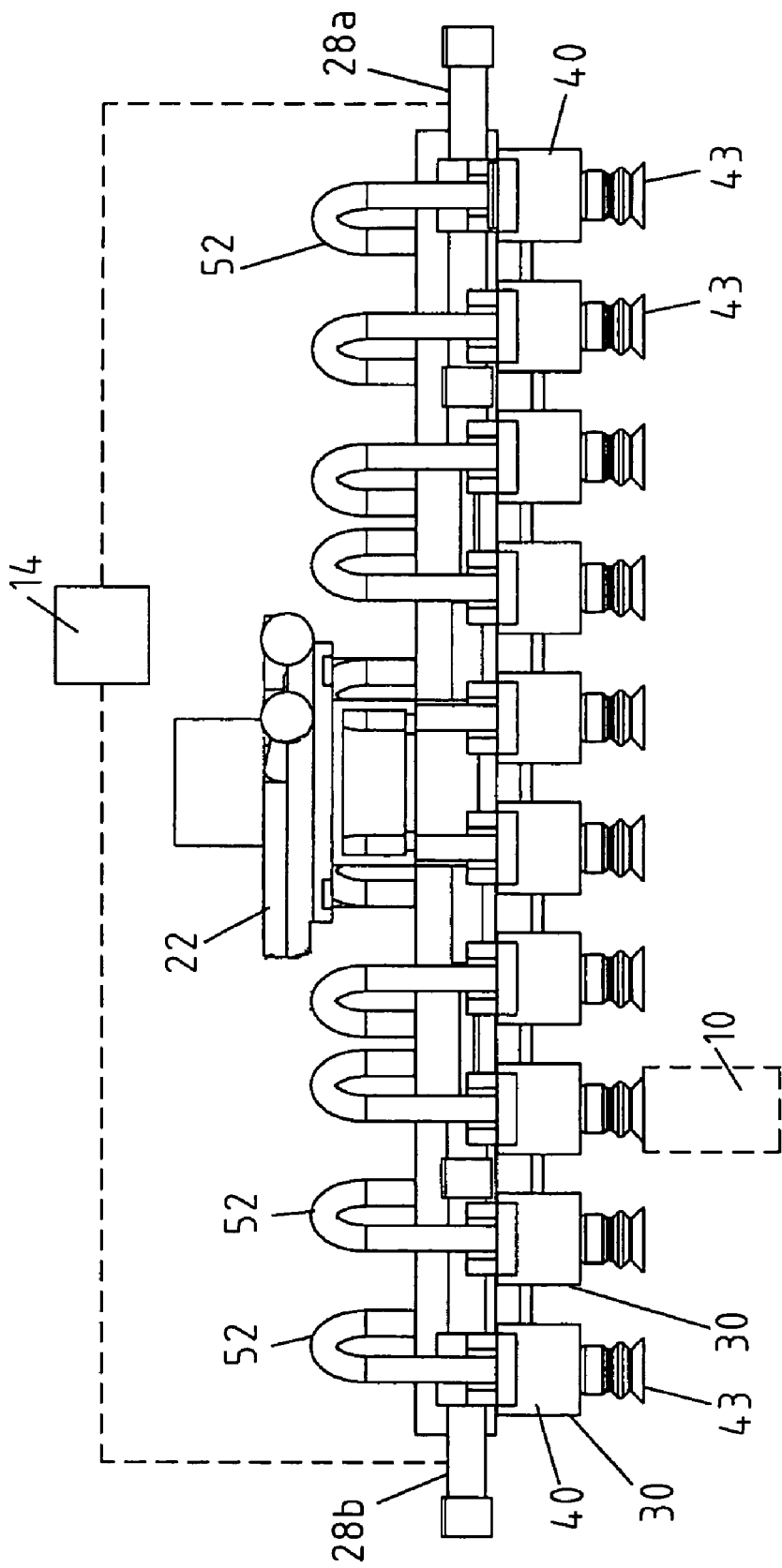

With reference to FIGS. 1a-1d, 2, 3a and 3b, and FIG. 4, an end effector generally designated 20 is illustrated. Although not shown as such in these Figures, in use end effector 20 is secured to a moving device such as the end of a robotic arm. End effector 20 is formed with a frame structure, to which a plurality of pick up members 30 are movably attached. In this embodiment, the frame is made from two, spaced apart hollow rectangular pipe members 26 secured in a rigid, longitudinally parallel relation to each other by a main medial hub assembly 22. The pipes 26 and hub assembly 22 may in some embodiments be made of a lightweight but durable material such as aluminum, or carbon fiber composites, fiberglass, similar light composites and the like. Each of pipes 26 is sealed at its ends with closed plugs (not shown) such that the only openings to the interior of the pipes are those openings which are connected to vacuum hoses, and a central opening to the main vacuum manifold in the hub assembly, as will be described hereinafter.

The overall path of vacuum air flow through end effector 20 is from the suction cups 43, through the carrier members, Into hoses 52, into and through one of pipes 26, and then through the passageway formed in hub assembly 22 to the external vacuum source.

Figure 2:
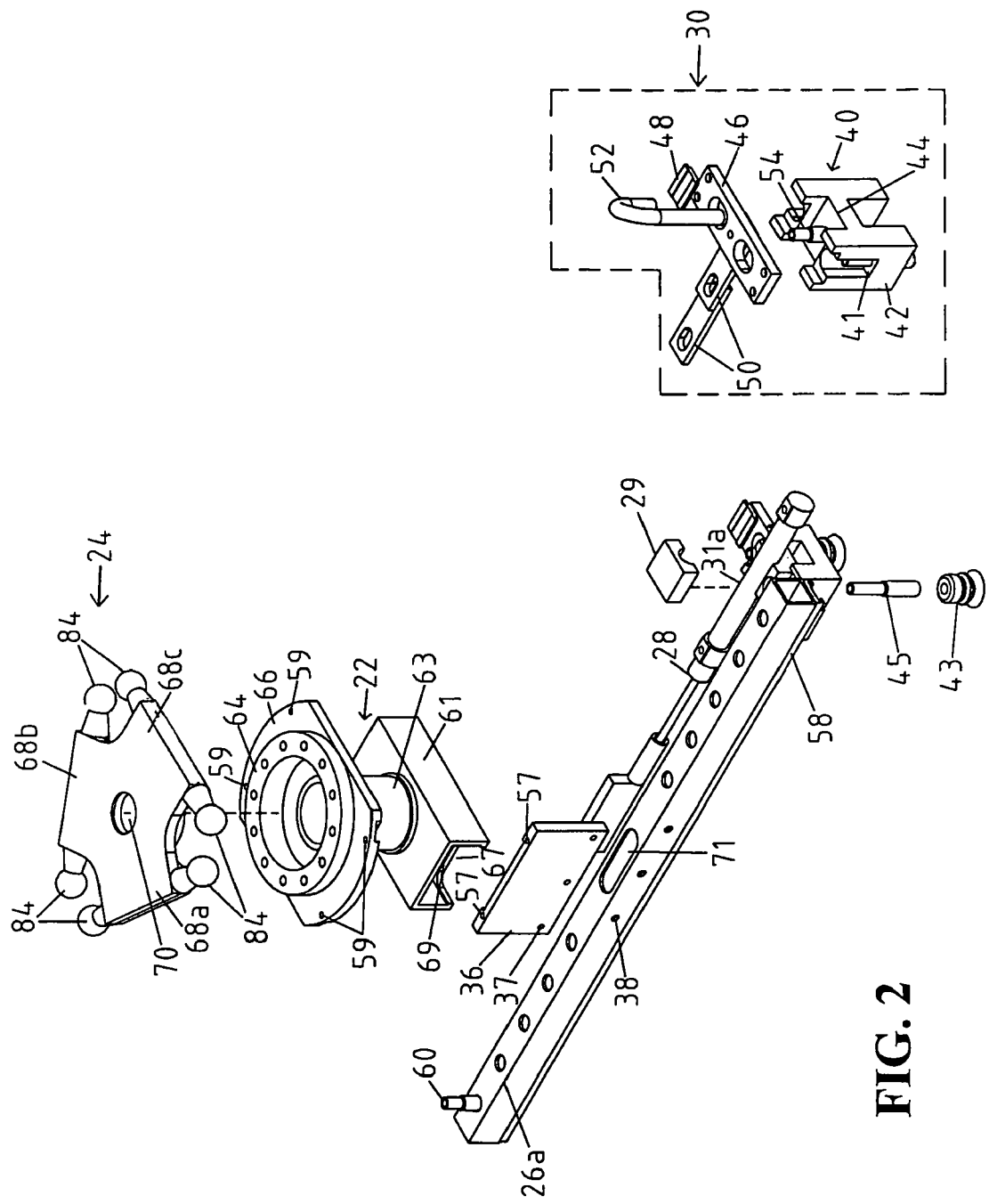

As shown in FIGS. 1a and 2, positioned longitudinally along the top face of each of the pipes 26 are holes or apertures 32. Holes 32 are preferably positioned at equal distances from each other. As shown by way of example in FIG. 2, a hollow pipe connector plug 60 is fitted at one end into each of the holes 32. In some embodiments, the pipe plugs 60 may be made of materials such as a plastic, suitable nylon, or other suitable materials. The pipe connector plugs 60 are connected at their other ends to flexible hoses 52. Flexible hoses 52 may in some embodiments be made of a flexible material such as a suitable rubber or nylon.

FIG. 2 provides an exploded top perspective view of parts of an end effector 20 showing only one of the two pipes 26. As can be seen clearly in FIGS. 1c and 2, attached to the bottom face of each pipe 26 is a longitudinally extending guide rail 58. Each of the pick-up members 30 used to lift items from a conveyor belt or some other location in the packaging system are mounted on guide rails 58 and can slide along them. Each guide rail 58 is preferably shaped as a rectangular track with a narrow slot in its bottom face. Rail 58 extends across substantially the entire length of the bottom face of pipe 26. Each guide rail 58 may in some embodiments also be made of a light but durable metal material or alloy, such as aluminum.

Each of pick-up members 30 used to lift the items to be packaged is suspended from the rails 58 through the slot by rectangular plate members 48 that can slide along the inside of guide rails 58. The plate members 48 can be comprised of different components but include sliding portions that engage the rails that are preferably made from a material that facilitates easy sliding of the pick up member 30 in the rails 58, for example, materials such as polyethylene or teflon.

With reference in particular to FIGS. 1b, 2, 3a and 3b the hub assembly 22 is mounted with side plates 36 to and between pipes 26, proximate the middle of each pipe 26. Like the other components from which end effector 20 is assembled, side plates 36 are preferably made of light but durable materials such as aluminum. Side plates have apertures to reduce the weight, Side plates 36 can be mounted onto pipes 26 by using conventional techniques such as screws that are inserted into drilled holes 37 on side plates 36, which pass through the entire width of the side plates and fit into screw holes 38 (shown in FIG. 2) drilled onto the outside portion of pipe 26.

As shown in FIG. 2, the hub assembly 22, comprises a cylindrical pipe 63 (preferably also made from a durable but lightweight material such as an aluminum), that Is connected to a manifold 61. The side openings of manifold 61 are sealed on either side with the side plates 36 which can be fastened therein or glued in place, or attached in other conventional ways. The bottom plate 69 of manifold 61 has opposed side openings 67 at the side edges of plate 69. Each opening 67 is mated with an opening 71 in the top face of a pipe 26 and abuts with side plates 36. Thus manifold 61 is sealed to pipes 26, with a substantially air tight seal such that air can flow from pipe 26 through openings 71 and 67 into manifold 61 and can then pass through pipe 63 to the vacuum source. A hose (not shown) connecting the vacuum source to pipe 63 can pass through a cylindrical slot 70 that passes completely through the movable connector member 24 that attaches the end effector 20 to the robot. In this way a vacuum can be applied to manifold 61 and pipes 26 to create a suction at suction cups.

The hub assembly is completed with a plate member 64 having an integrally formed flange 66. Flange 66 is secured with screws to the top edge of plates 36 side through screw holes 59 and 57 (FIG. 2). Once fastened to plates 36, plate member 64 contributes to the rigidity of the frame and provides a member to which movable connector member 24 of a moving device can be attached. In particular, in the embodiment of FIGS. 1a-3b, connector member 24 is configured for connecting end effector 20 to the arm (not shown) of a Delta robot such as the one manufactured by SIG Demaurex and used in their Presto packaging system, or the Delta robot manufactured by ABB Flexible Automation company and used with their IRB 340 FlexPicker packaging system. It will, of course, be appreciated that connection plate 24 can be configured for connecting end effector 20 to other types of robots. In the preferred embodiment, connector member 24 comprises a 3-legged flange that has ball bearings 84 attached to each arm 68a, 68b, 68c. Connector member 24 can be secured to plate member 64 in a conventional manner such as by screws.

Figure 3A:
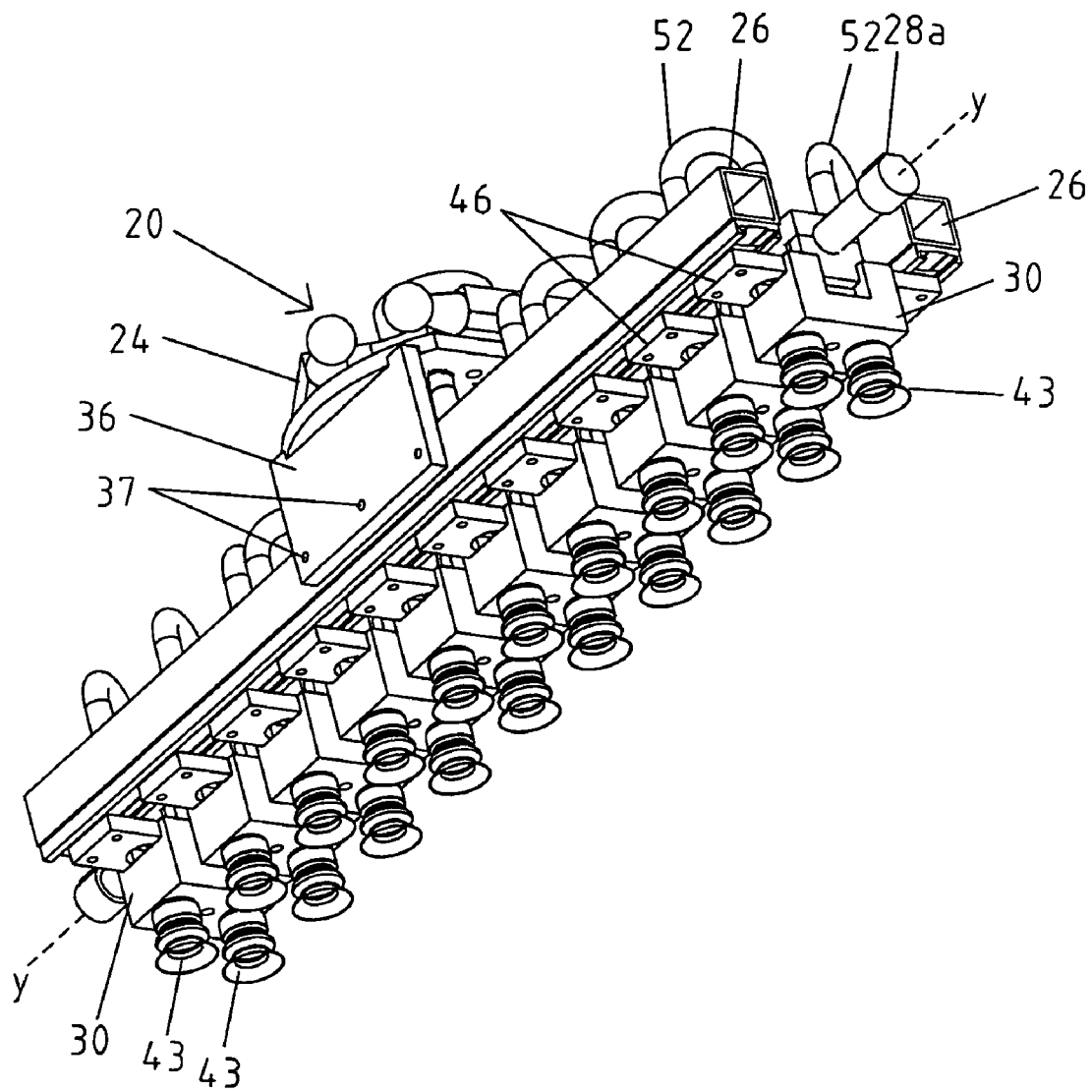
FIG. 3a is a bottom perspective view of the end effector of FIG. 1a in a diverged configuration.

FIGS. 1b, 1c, 3a and 3b illustrate a plurality of pick-up members 30 associated with end effector 20. The pick-up members 30 are arranged serially along a central longitudinal axis Y of end effector 20 (FIG. 3a). As shown in FIGS. 1a, 1b, 2, 3a and 3b, every pick-up member 30 includes a carrier guide 40. It should be noted that in FIG. 2, the carrier guides (exploded away from pipe 26) are formed in an H-section that consists of a bridge section 44 and two side leg sections 42 that are attached to either end of the bridge section, and extend above and below the bridge section. Carrier guide 40 is also shown in (FIGS. 1c and 1d) formed as being of a generally inverted C-shape, having side legs that extend only upwards from the bridge section. The H-shape is more suitable when end effector is to be used for carrying heavier and/or larger items. Various other configurations are of course possible. Preferably, the carrier guide 40 is made of a suitable plastic material such as a high density polyethylene, a suitable composite material, or some other equivalent light but durable material. Inserted into a hole in the middle of the bridge section 44 of each H or C-shaped carrier guide 40 is a pin formed from a hex-head shoulder screw 54. The screw 54 fastens the carrier guide 40 to a rectangular guide plate member 46.

Attached to each of the side edges of guide plates 46 are plates 48, each having outward extending flanges. Plates 48 are preferably made from a suitable plastic, and their flanges are received in the interior of guide rails 58. The width of the flanges of plates 48 is larger than the width of the bottom slot of the guide rails or tracks 58 such that the plates 48 can slide longitudinally in the interior part of rails 58 along the length of the rails, but cannot fall off from or out of the guide rails. When mounted onto rails 58 by fitting the plates 48 into the interior section of guide rails 58 through the far ends of the rails, each guide plate 46 can slide along at least a portion of the length of the rails. Preferably, guide plate 46 is manufactured from durable materials such as aluminum, or possibly other durable materials that are relatively lightweight. In the preferred embodiment most of the surface area of guide plate 46 is occupied by two elliptically-shaped slots which flank the middle part of guide plate 46. This configuration reduces the overall weight of guide plate 46. The middle part of the plate 46 includes a threaded bore into which hex-head shoulder screw 54 is inserted to fasten the carrier 40 to the guide plate 46.

In both the embodiment shown in FIG. 2 and the embodiment in FIGS. 1b, 1c, 3a and 3b, each carrier 40 has opposed upwardly extending leg sections 42. Each leg section has a rectangular slot 41 passing vertically down to the base portion 44 of the leg 42 (as can be seen in the exploded view of FIG. 2). A vertical bore is provided through leg section 42, with an upper opening at the bottom portion of the channel 41, and a lower opening at the bottom surface of leg section 42. Attached proximate the bottom opening of each bore is a rubber suction cup 43 with a small opening at the peak of the cup. A hollow tube 45 is fitted into the opening of suction cup 43. The tube 45 passes through the bore at the bottom of leg 42 and exits at the opening at the bottom part of slot 41. Each of tubes 45 (one passing through each bore in each of legs 42) is in turn attached to a flexible hose 62, which, as explained above, is attached to a pipe plug 60. The length of flexible hose 52 should not limit the extent to which a pick-up member 30 can move away from its respective pipe plug 60. As previously described, the pipe plugs 60 connect the flexible hoses to the hollow pipes 26, which in turn attach to hub 22 and an extraneous vacuum source (not shown). Thus, when the vacuum source is turned on, a suction force is created at suction cups 43 which causes items proximate cup 43 to be lifted and held by the suction cups.

Figure 4:
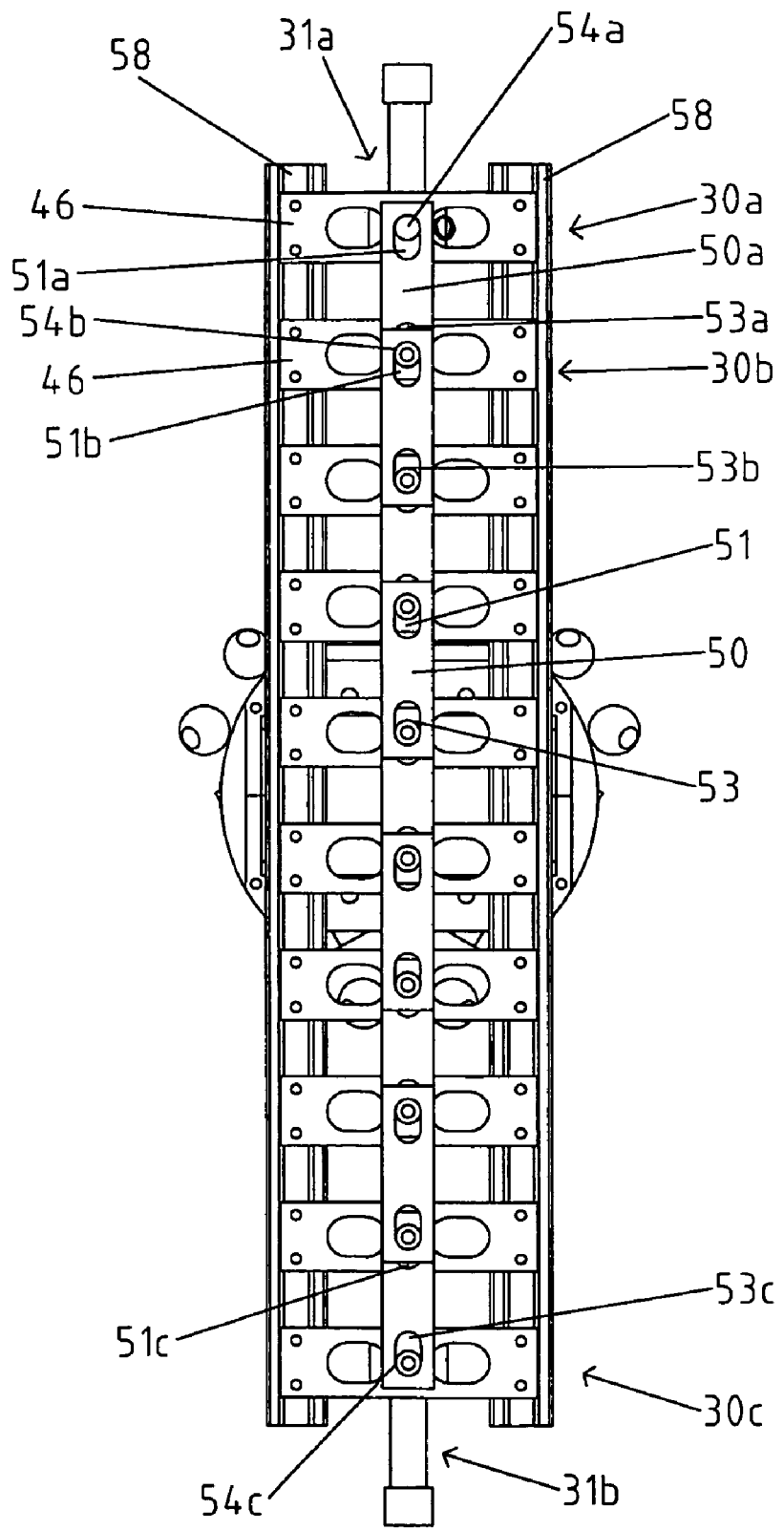
FIG. 4 is a bottom plan view of the end effector of FIG. 1a, with pick up members removed for clarity, showing the linkage of the pick-up members.

To control and facilitate the movement of the pick-up members 30, the pick-up members 30 that are mounted onto guide rails 58 are inter-connected to each other with an operational member interconnection mechanism. In the preferred embodiment of the present invention, a pick-up member 30 is connected to an adjacent pick-up member 30 by using an operational member interconnection mechanism comprising a tie link plate 50 as illustrated in FIGS. 2 and 4. Tie link plate 50 is preferably a rectangular plate, made of a plastic such as polyethylene or some other light but durable material. Each pick up member 30 (except those pick up members at the end of the end effector) will be interconnected to a pick up member on each side with a link plate 50. Each link plate 50 will have one or more slots which receive therethrough pin or rod 54 associated with each pick up member 30. Each pin or rod 54 is preferably made of steel, or some other strong wear resistant and good shear strength material, and is preferably hollow so as to reduce the weight of the pin or rod. In the preferred embodiment, each tie link 50 actually has two equal longitudinally extending slots 51, 53, each slot for receiving one pin of one pick up member 30.

A tie link plate 50 should be rigid enough that as a first pick-up member to which the tie link is connected is forced in an outward direction from the center of the end effector 20, the second adjacent pick-up member 30 to which the tie link plate 50 is connected is pulled in the same direction. Tie links 50 are preferably formed by extruding the plastic, or some other material that meets the required criteria, through a mould bearing the shape of a tie link 50. Those skilled in the art will of course realize that a tie link 60 may be manufactured by other manufacturing processes. The length of the slots 51, 53 in a tie link 50 controls the extent to which adjacent pick-up members 30 can be separated from each other. Generally, the larger the length of each slot, the farther the possible separation that is possible between the pins and their respective pick up members.

Other tie links can also provide the desired functionality. For example, a tie link can be provided with only a single slot receiving two pin members. The tie link could also be constructed in other ways such as with springs or rubber bands.

Figure 1C:
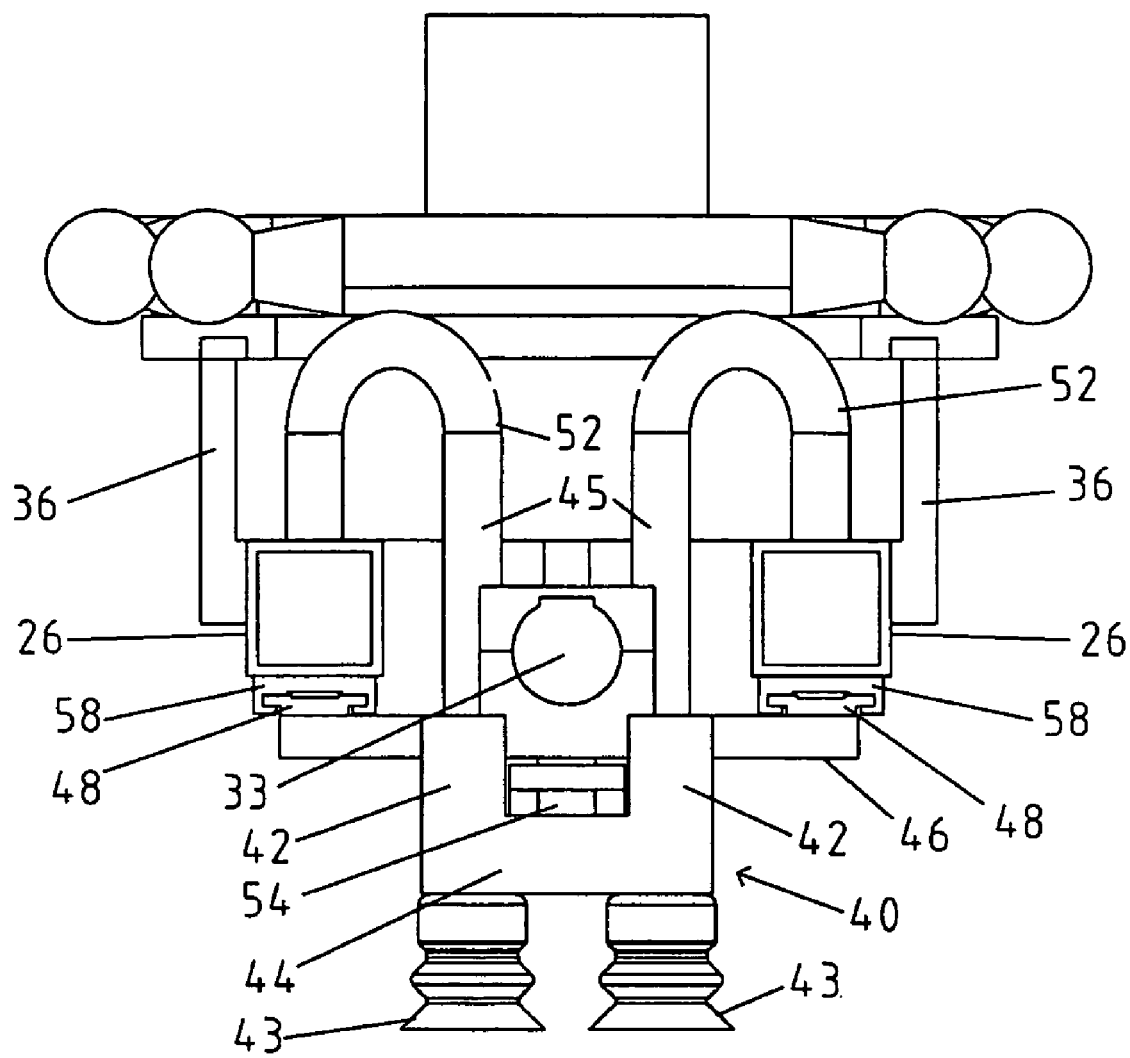

In the illustrated preferred embodiment, to link adjacent pick-up members, one slot of a tie link 50 is placed around the hex-head shoulder screw 54 of one pick-up member 30, while the other slot is placed around the hex-head shoulder screw 54 of the adjacent pick-up member 30. It will be apparent, that with the exception of the pick-up members 30 that are located at the far ends of the end effector assembly, two tie links are placed around every hex-head shoulder screw, with each tie link 50 connecting a pick-up member 30 to the pick-up members 30 on one of its two sides. As shown in FIG. 4, the tie links 50 are arranged in overlapping relationship. Once the tie links 50 are placed on the hex-head shoulder screws 54 of the pick-up members, the screws 54 can be fastened to the guide plate 46. As shown in FIG. 1c, the tie links 50 are held above bridge sections 44 and below guide plates 46 between leg sections 42.

Thus, a chain of pick-up members 30 can be mounted onto guide rails 58 by placing the plates 48, corresponding to one pick-up member 30, through the opening at the side of guide rails 58, sliding the pick-up member 30 along the rails, and repeating the same for the other pick-up members 30. Once pick up members 30 are mounted on the rails, the end of the rails 58 could be sealed.

Figure 1D:
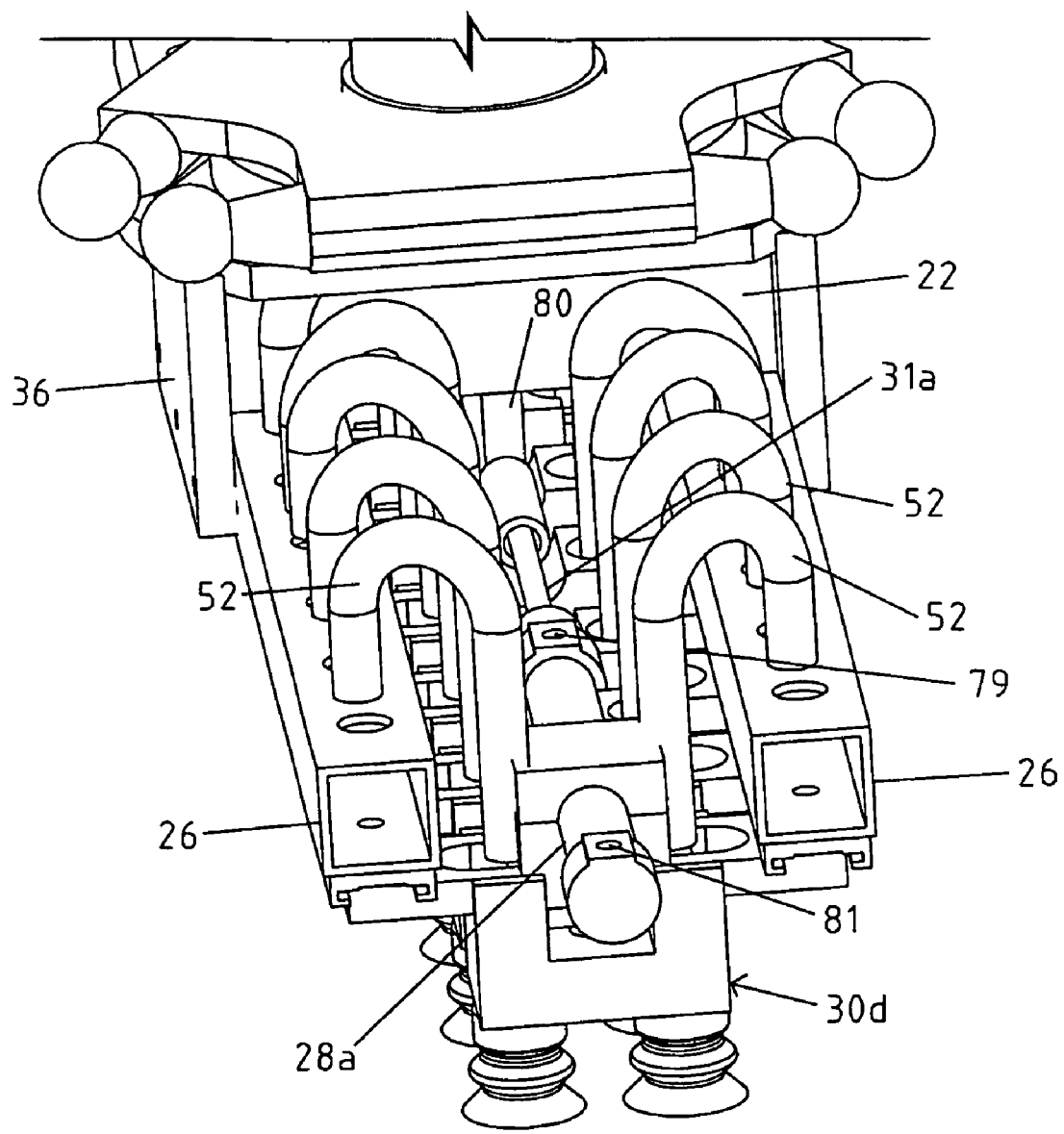
FIG. 1d is a top perspective view of the end effector of FIG. 1a, from one side.

Control of the movement of the pick-up members 30 is achieved by controlling the movement of one, or more, pick-up member 30 using an actuation mechanism. Since all the pick-up members are interconnected to each other through a chain of tie links 50, moving one leading pick-up member 30 in a chain can cause the movement of other following pick-up members as well. In the preferred embodiment of FIGS. 1a-4, two double acting pneumatic cylinders 28a and 28b are used to directly after the positions of the pick-up members 30 at the ends of the end effector 20. As best shown in FIG. 1d cylinder 28a (which is mounted and constructed identically to cylinder 28b) Is connected to a compressed air source (not shown) through pipes connected to fittings 79 and 81. A bulkhead member 80 is fixedly attached to, and depends down from hub assembly 22. Cylinder 28a is mounted between bulkhead member 80 and pick up member 30a located at one end of end effector 30.

In one embodiment, industry standard double acting pneumatic cylinders, such as those manufactured by Festo, are used. As will be appreciated by the person skilled in the art, in a double acting pneumatic cylinder, the piston in the cylinder can be pushed in two opposite directions, thereby allowing for the actuating rod attached to the piston to be either extended or retracted. Cylinder 28a can have its rod 31a extend by forcing compressed air into fitting 81 and venting fitting 79. Rod 31b can be retracted by venting fitting 81 and applying compressed air to fitting 79. Compressed air is applied to fittings 79 and 81 with hoses (not shown), and venting takes place in known ways which can for example include a controller and valves, which can be integrated with the overall control of the moving device.

Additionally it will be appreciated that cylinders 28a and 28b can be controlled by for example a Programmable Logic Controller ("PLC") (not shown) so that they work in unison. Therefore, they can have their rods 31a, 31b extended and retracted at the same time.

The actuating rods 31a and 31b of pneumatic cylinders 28a and 28b pass in a longitudinally extending channel 33 (see FIG. 1c) above the carrier guides 46 of the pick up members. As shown in FIG. 2, the actuating rod 31a of one pneumatic cylinder Is fastened to plate 46 of pick-up member 30a using a clamp 29 and screws or bolts. The pneumatic cylinder 28a and its rod 31a are aligned so that the length of the cylinder 28a and rod 31a are oriented parallel to the length of pipes 26.

In operation, the items that are to be packaged are positioned on a conveyor belt system or some other platform forming part of a packaging system. In the preferred embodiment, the end effector 20 is attached to a Delta robot. Optionally, the Delta robot may also include a sensory system, familiar to those versed in robotics, to determine the exact locations of the items to be picked up and moved, and the distances separating them, so that the end effector 20 can be positioned accordingly. It will however be typical for products only to be either picked up or dropped off when the carrier members 30 are either fully diverged or fully converged The control system of the Delta robot (not shown) positions the end effector 20 attached to moving member 24 above the items to be picked-up. Positioning of the end effector above the items to be picked-up is done in ways known to those familiar in the art of automated and robotic system control. The control system controlling the operation of the pneumatic cylinders 28a and 28b then releases compressed air that causes the pistons of the pneumatic cylinders 28a and 28b, to extend the actuating rods 31a and 31b to a desired position, so that the pick-up members 30 are situated above the items to be picked-up. The control system of the robot also will position the end effector as a whole (i.e. move the frame) to the correct position. Control of the pneumatic cylinders 28a and 28b and the extension of the actuating rods is done in ways known to those versed in the art of pneumatic cylinder control, such as by having valve operation controlled by a PLC or the robots controller.

With reference to FIG. 4, the actuation of the pick-up members 30 attached to pneumatic cylinders is shown. When the actuating rod 31a attached to the pneumatic cylinders 28a is extended, the pick-up member 30a at the far end of one side of the end effector is extended outwardly and away from the center of the end effector. The hex-head shoulder screws 54a of the far end pick-up member 30a starts moving outwardly in the slot 51a of the tie link 50a in which the screw 54a is placed until it starts pressing against the outer side of the opening 51a in tie link 50a. This in turn causes the tie link 50a to be pushed outwardly, thus causing the side edge of opening 53a in tie links 50a to push against the hex-head shoulder screws 54b of the adjacent pick-up member 30b. This causes pick-up member 30b to also be pulled outwardly and away from the center hub assembly 22 of end effector 20. The other pick-up members 30 inter-linked to pick-up member 30a will also be pulled outwardly and away from the center of the end effector 20. Similarly, the same effect is achieved on the other side of hub assembly 22 when actuating rod 31b attached to the piston of pneumatic cylinder 28b extends outwardly, but in a direction opposite that in which the actuating rod 31a and pick-up member 30a is moved. The result is that when the cylinders are fully extended, the pick up members 30 are configured as shown in FIG. 3a, with the pins (screws 54) being positioned at the outer edges of the slots in tie links 50 (as shown in FIG. 4).

It will be appreciated that in this embodiment, if the actuating rods 31a and 31b are extended by less than their maximum extension, separation between the pick-up members 30 will be non-uniform since the partial extension of the pick-up members at the far ends of the end effector 20 may not be enough to cause the tie links 50 linked to the pick-up members closer to the center of the end effector to push those pick-up members outwardly. Therefore, where the actuating rods 31a and 31b are not fully extended, the pick-up members will be more closely clustered or spaced near the center of the end effector 20.

Once the pick-up members 30 are positioned exactly above the items to be picked-up, the end effector is lowered so that the suction cups 43 attached to each carrier guide 40 of each pickup member 30 are brought into contact with the items to be picked-up. The vacuum source attached to the Delta robot will then be activated (if it has not already been activated) thereby creating a suction force at the suction cups 43. This causes the items on a conveyor belt (not shown), or other platform on which the items are located, to be lifted off the conveyor belt, and held by the suction cups 43.

The Delta robot next moves the moving member 24, and the end effector 20 connected to it, in the direction of the receptacle where the items are to be deposited. The position and orientation of the end effector is controlled by the arm sections of the Delta robot. While the end effector 20 moves towards the destination receptacle, the actuating rods 31a and 31b can start retracting by having compressed air from the compressed air source applied to, and corresponding venting of the fittings of the pneumatic cylinders 28a and 28b so that the pistons are moved back into their retracted positions. This in turn causes the pick-up members 30 on either side of the central portion, to converge back toward the center of the end effector 20, to the position shown in FIG. 3b. This enables the items carried by the end effector 20 to be deposited into the receptacle (not shown). The extent of the desired convergence of the pick-up members 30 will depend on the size of the receptacle into which the lifted items are to be deposited. A receptacle with a relatively small opening will require that the pick-up members 30 be more tightly converged.

Figure 3B:
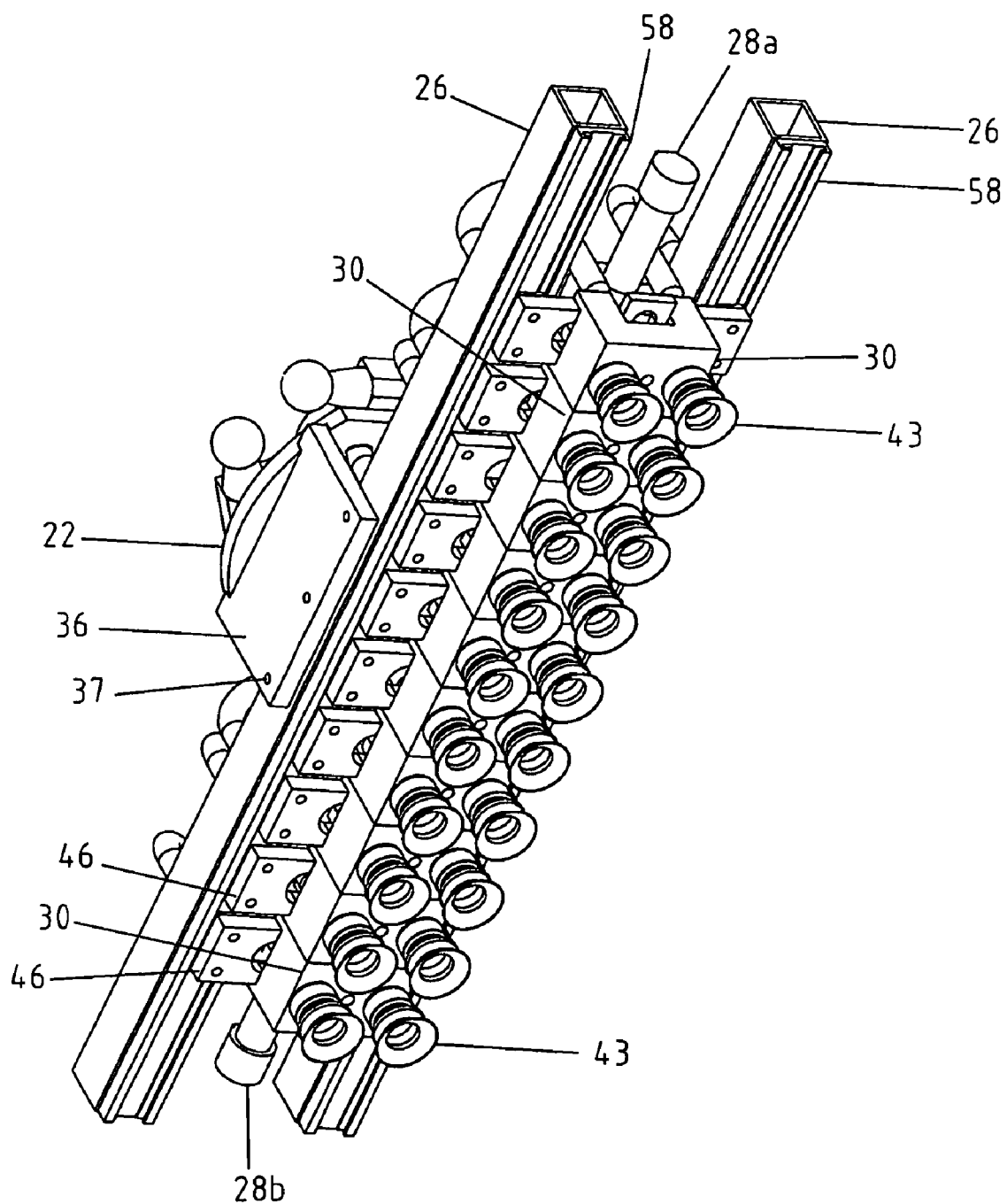
FIG. 3b is a bottom perspective view of the end effector of FIG. 1a in a converged configuration.

The extent to which the cylinders can retract and compress pick up members 30, will be determined by the movement of the rods, the configuration of the slots in the tie links 50, and the physical size and shape of the pick up members themselves. It is usually desired that the 30 members be able to be compressed until they are in abutment with each other as shown In FIG. 3b, so that in fully converged position, the pins of the end effectors are not in abutment with the inside faces of the slots 51 and 53. However in other embodiments, the tie links themselves, and in particular the configuration of the slots 51 and 53, can be selected so that during the contraction, the tie links inner faces interact with the pins to push the members together and this determines the minimum separation of members 30.

Once the end effector 20 reaches a position directly above the destination receptacle, the end effector 20 is lowered into the receptacle. The suction force at suction cups 43, created by the vacuum source, is cut off, thereby releasing the items from the suction cups 43. The end effector is then raised, and the Delta robot can then move the end effector 20 to a position above the next batch of items to be packaged. The destination receptacle into which the items were deposited is, meanwhile, further processed by the packaging system.

One disadvantage of using pneumatic cylinders to actuate the position of the pick-up members is that pneumatic cylinders have non-linear behavior due to the use of compressed air as the means of controlling the position of the pistons in the cylinders. This leads to poor control of the speed and precise position of the pistons. Accordingly, in the second embodiment of the present invention an end effector is implemented with a more precise actuation mechanism (also referred to herein as an actuator).

Figure 5A:
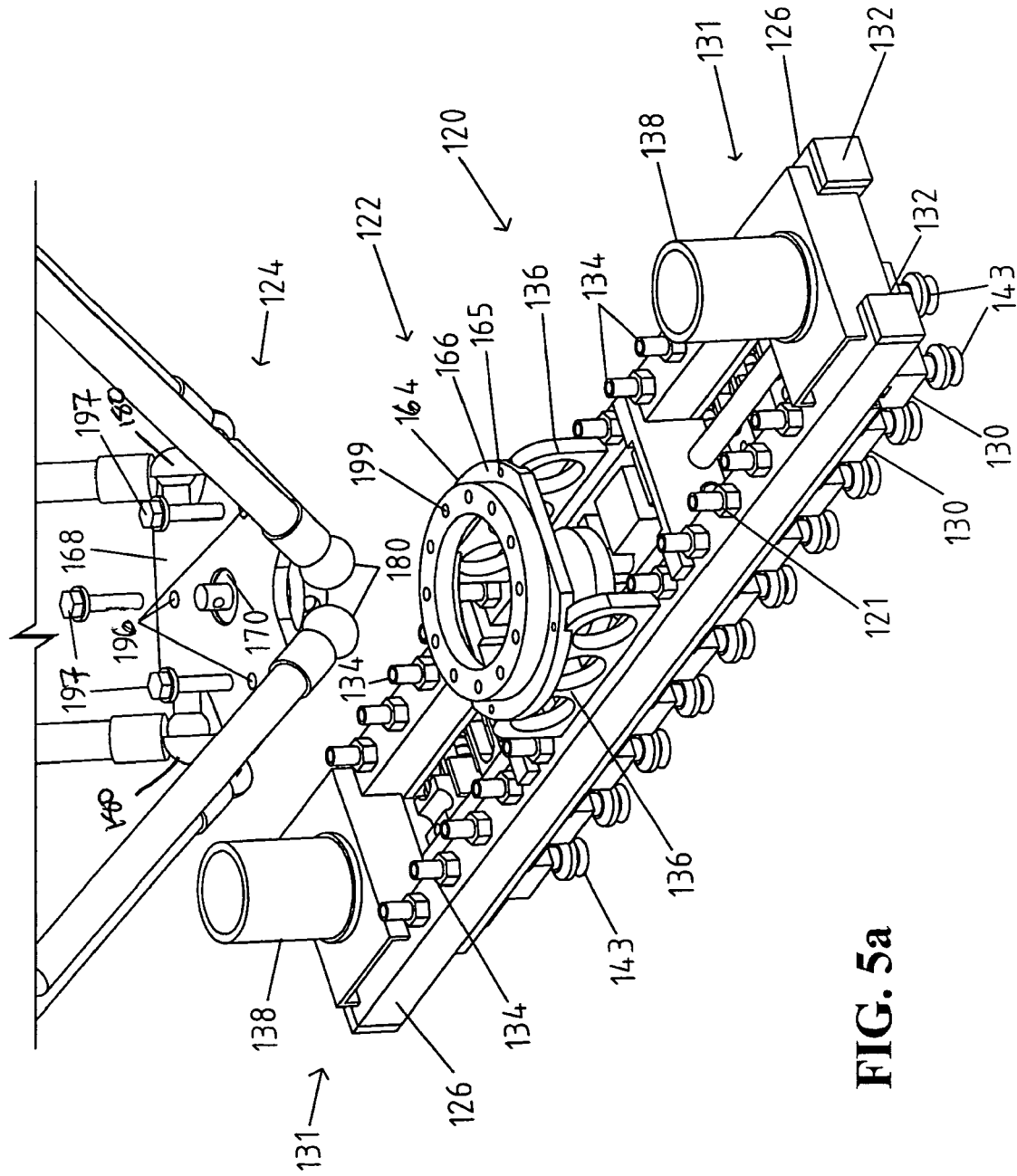
FIG. 5a is top perspective view of an end effector in accordance with a second embodiment of the invention.
Figure 5B:
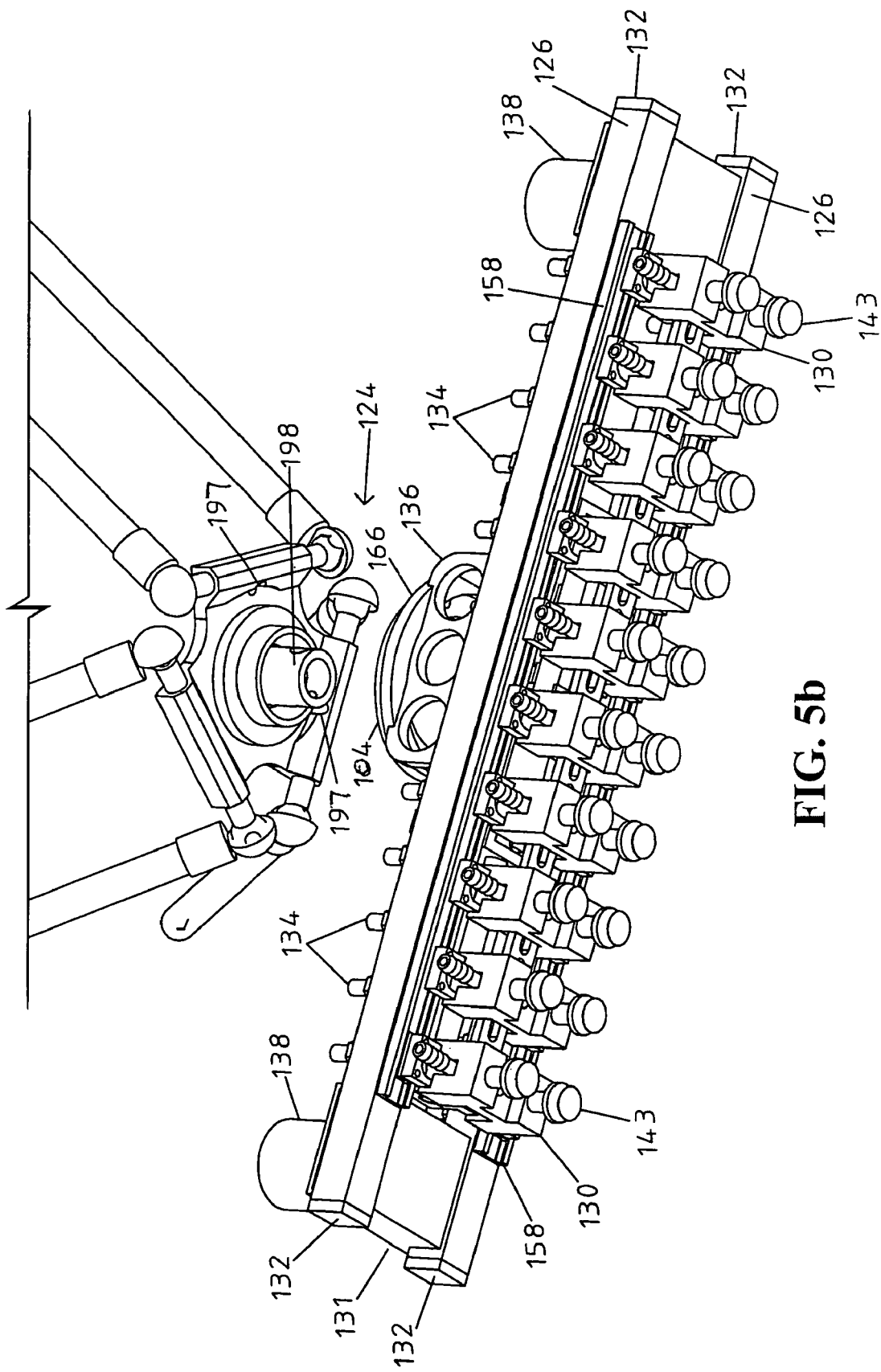
Figure 5C:
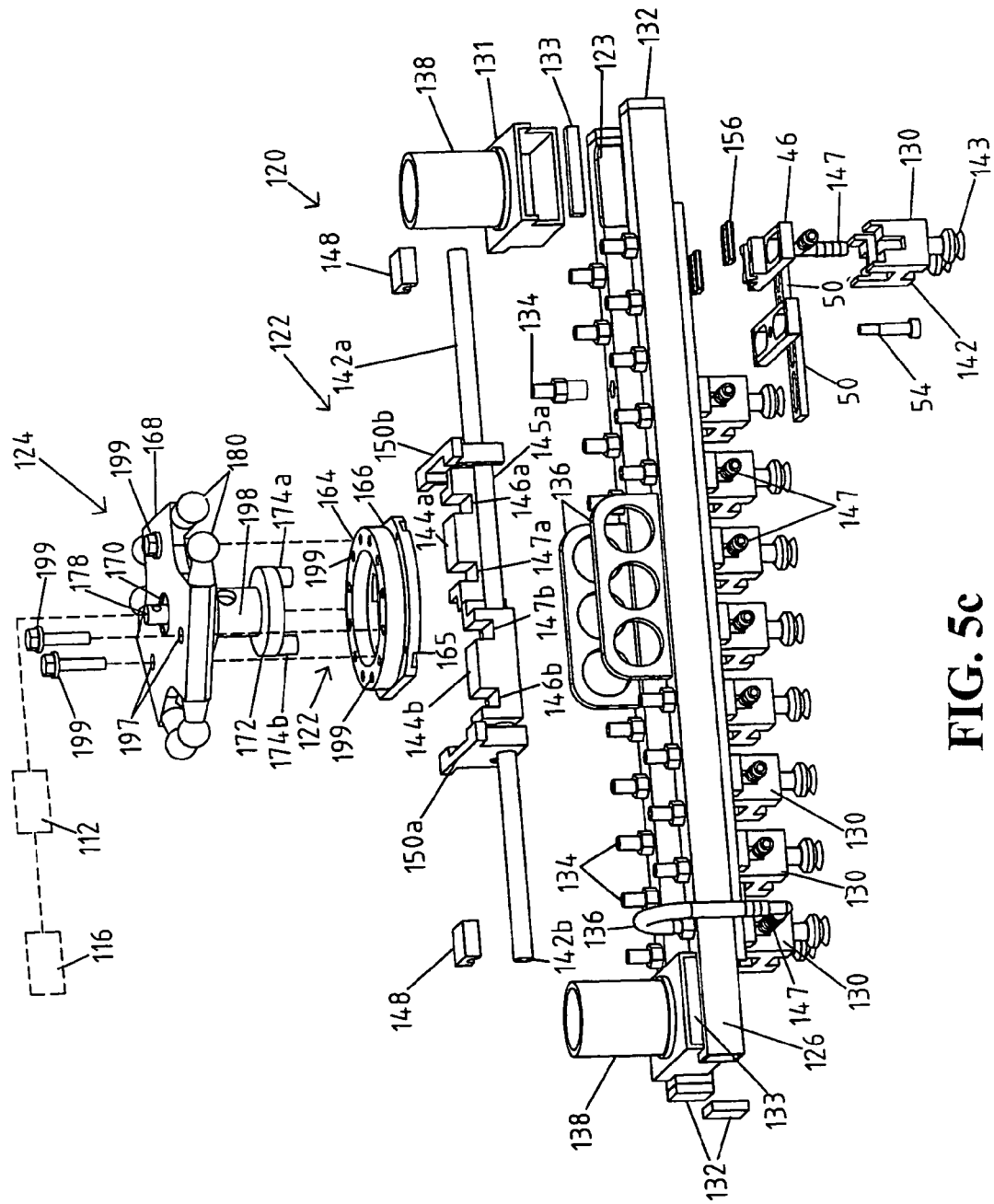
Figure 5D:
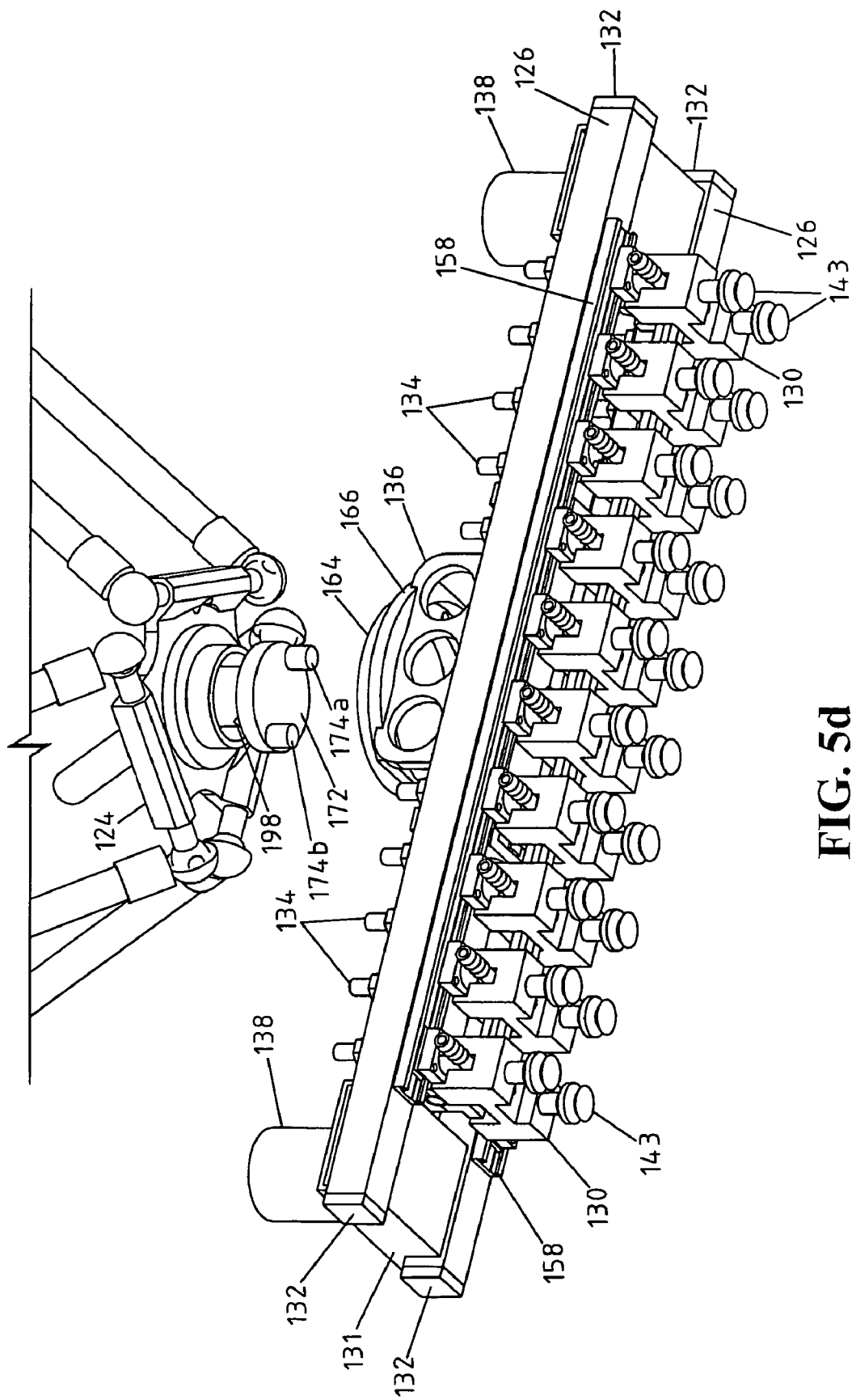
FIG. 5d is a view similar to FIG. 5b showing the mounting of the cam disc.

With reference to FIGS. 5a, 5b and 5c an end effector 120 is shown, and which is constructed in a manner similar to end effector 20. End effector 120 comprises a frame that may consist of two hollow rectangular pipes 126 that are open at their far ends. Pipes 126 are configured in a parallel longitudinal arrangement. A pipe cap 132 is inserted into each of the openings at the far ends of the pipes, thus sealing the pipes 126 at their ends. Fitted into holes 121 located on the top surface of the pipes 126 along the main axis of the pipes 126 are connector pipe plugs 134. Connected to each pipe plug 134 is one end of a flexible hose 136 (for clarity in the figures, only one such hose 136 is shown, in FIG. 5c) made of flexible, and preferably resilient material, such as rubber.

Each hose 136 is attached at its opposite end to a hollow connector tube 147 (like tubes 45 in the previous embodiment). The tube 147 is received inside the bore on one of the legs 142 of an operational member such as a pick-up member 130. The pick-up members 130 used in this embodiment of the end effector of the present invention are substantially the same pick up member 30 as those described in relation to the first embodiment of the end effector. As will become apparent below, because the actuation mechanism used in conjunction with the second embodiment of the end effector is bulkier and occupies more space than the actuation mechanism used with the first embodiment of the end effector, it is more expedient to pass the flexible hoses 136 on the outer sides of the hollow pipes 126 than from the inner sides of the pipes. Furthermore, to allow for easy attachment of the flexible hoses 136 to hollow connector tubes 147, a generally C-shaped tube can be used.

A hose 136 also extends from a pipe plug 134 on the opposite, second hollow pipe 126, positioned across from the first pipe plug, and attaches to the hollow connector tube 145 received inside the bore on the other leg of the same pick-up member 130. Accordingly, every pick-up member 130 is attached to two with connectors 147 to two flexible hoses 136, one extending from each of the hollow pipes 126.

Each pipe 126 also consists of two inner side openings 123 located proximate to the ends of the pipes 126. Each opening extends inwardly from the middle of the top side of each pipe 126 towards the center of the end effector down to the middle of the inner side of each pipe. The openings on one pipe 126 are positioned opposite and across from the openings on the other pipe 126.

Two hollow, generally T-shaped header manifold assemblies 131 are provided at opposite end of the pipes 126 in between the side openings 123 on each pipe 126, thereby completely covering and substantially sealing the openings 123 in the pipes 126. Manifold assemblies 133 have side plate members 133 which complete the side seals. A circular bore is provided in the top surface of each of the T-shaped header manifold assemblies 131, and a cylindrical pipe 138 is fitted into the bores. Connected to each of the cylindrical pipes 138 is one end of a hose (not shown), that is in turn connected at its other end to an extraneous vacuum source (not shown). The suction cups 143 on each of the pick-up members 130 are therefore interconnected to the vacuum source through the hollow tubes 145, which are connected to flexible hoses 136, that are connected to the pipe plugs 134, that are fitted into the hollow pipes 126 and which in turn are connected to the T-shaped manifold assemblies 131, that are connected to cylindrical pipes 138, which are in communication with the vacuum source. Consequently, when the vacuum source is turned on, a suction force is created at the suction cups 143, thereby lifting and holding items to be packaged when they are located proximate suctions cups 143. Of course, it will be appreciated that a different gripping mechanism may be employed to lift and transfer the items to their destination receptacles instead of the vacuum based mechanism used in this embodiment.

Attached to the bottom of each pipe 126 is guide rail 158. As with end effector 20, each guide rail 158 of end effector 120 is preferably also a hollow rectangular pipe with a narrow opening at the bottom surface of the pipe extending longitudinally along the entire length of guide rail 158. Mounted on the guide rails 158 are pick-up members 130. The pick-up members 130 are linked to each other using the tie link 50 mechanism described above. Each tie link 50 links together two adjacent pick-up members 130 by placing the hex-head shoulder screw 54 of one of the pick-up members 130 through one slot of the tie link 50, and placing the hex-head shoulder screw of the adjacent pick-up member 130 through the other slot of the tie link. The chain of pick-up members 130 is then mounted onto guide rails 158 by fitting the plates 156 attached to the sliding carrier guide 46 of each of the pick-up members through the opening at the far ends of the guide rail 158, and sliding the pick-up members down the guide rails 158.

Mounted on the upper surface of each of pipe 126, at a medial position, is a side plate 136. Hub assembly 122, comprising of a cylindrical hub portion 164 and a flange 166, is then fastened to the side plates by using screws 165 to attach the flange 166 to top edges of side plates 136. Fitted within the cylindrical hub portion 164 of hub 122 and bearing mounted on robot connection member 124 of the robot, is a rotary cam device (also referred to simply as a rotary device) 172. Rotary cam device 172 may be a circular disc having moving elements that may in the form of cam followers 174a, 174b which interact with respective generally transversely oriented cam surfaces in cam slots (cam slots being also referred to herein as cam tracks) in cam devices such as cam blocks 144 to provide cam movement to effect the actuation of the pick-up members 130 of the end effector 120, and thus cause movement of the pick-up members 130 in a longitudinal direction relative to the frame.

Pipes 126, manifold assemblies 131, side plates 136, rotary cam disc 172, hub portion 164 and flange plate 166 can all be made from lightweight but durable materials such as, for example, aluminum.

The cam followers 174a, 174b may be small knobs or pins positioned diametrically opposite to each other on disc 172 proximate the perimeter of the bottom surface of rotary cam 172. As will become apparent below, the cam followers 174a, 174b engage the actuation mechanism portion of the end effector 120 and control the outward expansion or convergence of pick-up members 130.

The rotary cam 172 can be bearing mounted to moving connector member 124 of a Delta robot using a cross nut or other conventional mounting mechanisms. Cam disc 172 is secured to the end of a shaft 198 that extends through a slot 170 in member 124. Moving member 124, much like moving member 24 of the first embodiment of the present invention, is the part of the Delta robot that moves about in a three-dimensional space. Moving member 124 comprises of a 3-legged shaped flange 168, at the middle of which, is a threaded cylindrical slot 170. A rotatable shaft (not shown) extending from the Delta robot is fitted into slot 170 and attaches to a shaft connector 178 which in turn is connected to shaft 198. The rotatable shaft of the Delta robot is connected to a motor (not shown) that controls the rotation of the shaft. Thus, the combination of the rotatable shaft of the Delta robot, the shaft connector 178 and shaft 198 comprise a rotatable drive shaft and as will be evident from FIGS. 5a-5c, and FIGS. 6a-6c, the robot shaft and shaft can both rotate about a common shaft axis that is oriented generally orthogonally to both the transverse direction of the cam slots 146a, 146b and 147a, 147b and the direction of movement of the pick up members relative to the frame. Rotation of the robot's shaft thus causes shaft connector 178 to rotate. This causes shaft 198 to rotate and thus rotary cam 172 to rotate clockwise, or counter-clockwise so as to control the actuation of the pick-up members 30.

To secure end effector 120 to the robot arm, screws 199 are used, passing through holes 197 in flange 168 to attach in holes 199 (typically only three are needed) of hub portion 166. This connects hub assembly 122 to the underside of connector member 124.

Hub assembly 122 (1) produces structured rigidity to the frame of the end effector (2) provides a securement mechanism for mounting effector 120 to the robot through attachment to connector member 124 and (3) provides rigidity to resist the forces imparted during rotating of cam disc 172 which moves cam blocks 144.

The actuation mechanism portion 140 that interacts with the cam followers 174a, 174b comprises of two cam slider blocks 144a and 144b, each can be made of a plastic such as for example, polyethylene or of a comparable lightweight and durable material. Each cam block has two transversely oriented, spaced cam slots 146a, 147a and 146b, 147b that are formed in top surfaces of each of the cam blocks.

Extending from each side of each cam block 144a, 144b are rod members that comprise an example of a connection mechanism (also referred to simply as connectors) interconnecting the cam blocks with the pick up members. Thus cam block 144a has rod 142a extending longitudinally from one of its sides and which is clamped at its end to a pick-up member 130 using a clamp 148. The pick-up member 30 to which the push rod 142a is clamped is the pick-up members situated at the far end of the end effector. That is, push rod 142a of cam block 144a is attached to the far end pick-up member 130a at one end of the end effector. Push rod 142a at its other end is attached to a cam block 144a. Attached to the other side of each of cam block 144a is rod 145a. Rod 145a is not clamped to any pick-up member but is merely used to properly guide the movement of cam block 144a, and to prevent the cam block 144a from wobbling while being engaged by the rotary cam 172.

Likewise, cam block 144b has rod 142b extending longitudinally from one of its sides (on the opposite side to rod 142a) and which is clamped at its end to a pick-up member 130b using another clamp 148. The pick-up member 130 to which the rod 142b is clamped is the pick-up members situated at the far end of the end effector, opposite to the pick up member to which rod 142a is attached. Rod 142b at its other end is attached to a cam block 144b. Attached to the other side of cam block 144b is rod 145b. Rod 145b is not clamped to any pick-up member but is merely used to properly guide the movement of cam block 144b, and to prevent the cam block 144b from wobbling while being engaged by the rotary cam 172.

The cam blocks 144a, 144b and the rods attached to them are positioned between the two hollow pipes 126. The actuation mechanism is secured to the hollow pipes 126 by using two plastic T-shaped bearing plates 150a and 150b. Each T-shaped bearing plate is fixed to the hollow pipes 126 by fastening the arms extending from the top of the bearing plate to the hollow pipes 126 using screws. Preferably, each T-shaped bearing plate is positioned on either side of the side plates 136, between the side plates and the first set of pipe plugs 134 immediately next to the side plate. Each bearing plate 150a and 150b also consists of two apertures situated near the bottom of, and transversely spaced on the plate. As better seen in FIGS. 6a and 6b, rod 145a of cam block 144a passes through one hole in bearing plate 150a, while push rod 142b of cam block 144b passes through the other adjacent hole in plate 150a. Likewise, rod 145b of cam block 144b passes through one hole in bearing plate 150b, while rod 142a of cam block 144a passes through the other adjacent hole in plate 150b. This arrangement of two rods attached to every cam block and having the rods passing through holes in two bearing plates that are rigidly secured to the pipes 126 allows the cam blocks to maintain stability without wobbling. Additionally, block 144a, can move longitudinally and pass by block 144b in close or abutting relation thereto.

FIGS. 6a and 6b illustrate the operation of the actuation mechanism of the second embodiment of the end effector 120. FIG. 6b shows the two sliding cam blocks 144a and 144b, in their mid positions relative to the end effector. At that position, the two cam blocks are aligned so that the two blocks are at the same longitudinal position. Additionally, in the mid-point position the cam followers 174 are positioned inside the slots 146a and 146b of both cam blocks 144a and 144b, effectively straddling both cam blocks. As can be appreciated from the mid-position drawing of FIG. 6b, the separation between the slots 146 and 147 of each cam block as measured from the interior walls of each slot has to be slightly smaller than the diameter of the rotary cam 172 so that the cam followers 174a, 174b could be properly placed inside the slots at the mid-point position.

Starting from the position shown in FIG. 6a, the movement of cam followers 174a, 174b in the slots in the cam blocks 144a, 144b is shown in FIG. 6c. As the rotary cam 172 begins to rotate counter clockwise from 0 degrees, one cam follower moves outward in slot 147a of cam block 144a, while the other cam follower moves outward in slot 147b of cam block 144b. As the rotary cam rotates, the cam follower inside slot 147b of cam block 144b exerts pressure on the wall of slot 147b, thereby pushing cam block 144b toward the center of the end effector. Consequently, pick-up member 30a, clamped to rod 142*b* of cam block 144*b*, converges toward the center of end effector 120. The same effect is achieved by the movement of cam block 144*a* and rod 142*a*, likewise converging the pick up member to which it is attached toward the center.

The movement of the cam followers and cam blocks continues as shown in FIGS. 6*a*-6*c*, with the rotation of rotary disc 172 and the accompanying movement of the cam followers. When the cam followers reach the position shown in FIG. 6*c* as 360 degrees the pick up members will be in their fully converged position.

By reversing the direction of rotation of the shaft to which the cam followers are attached, the pick up members to which rods 142*a*, and 142*b* are attached can be extended outward away from the central hub assembly. Since all the pick-up members 130 mounted on end effector 120 are inter-linked to each other by tie links 50, at the fully extended position of the cam blocks 144*a* and 144*b*, all the other pick-up members mounted on end effector 120 will reach their fully extended position.

In operation, the control system controlling the Delta robot positions the end effector 120 coupled to the moving member 124 above the items that are to be packaged. Optionally, a sensory system may be used to determine the exact locations of the items on the conveyor belt or other platform on the packaging system, so that the end effector could be positioned accordingly. The rotary cam is then rotated clockwise to extend the far end pick-up members clamped to the pushing rods attached to each cam block, thereby extending the pick-up members linked or interlinked to the far end pick-up members through tie links 50. The pick-up members 130 are extended until they are situated directly above the items that are to be packaged. Subsequently, the end effector 120 is lowered so that the suction cups 143 attached to the H-carrier guide of each of the pick-up members 130 touch the items to be picked-up. The vacuum source interconnected to the suction cups is turned on, thereby creating a suction force at the suction cups 143, which causes the items to be packaged to be lifted and held by the suction cups.

The Delta robot next moves the end effector 120 in the direction of the receptacle where the items are to be deposited. The position of the end effector 120 is controlled by the non-jointed arm sections of the Delta robot, while the orientation of the end effector about the z-axis is controlled by the rotatable shaft of the Delta robot inserted into slot 170 on moving member 124. Preferably, while the end effector is en-route to the receptacle, the control mechanism of rotary cam 172 begins to rotate the rotary cam counter-clockwise, thereby causing the push rods 142*a* and 142*b* of the respective cam blocks 144*a* and 144*b* to be retracted back to the center of the end effector. This in turn causes the pick-up members 130 to converge back to the center of the end effector, thereby allowing the picked-up items to be easily deposited into the destination receptacle.

Once the end effector 120 reaches a position directly above the receptacle, the end effector is lowered until the items are placed inside the destination receptacle. Subsequently, the vacuum source is cut off, thereby releasing the items from the grip of the suction cups 143. The end effector is then raised above the top opening of the receptacles, and is repositioned by the Delta robot to pick-up the next batch of items.

It will be appreciated that the system could be used in an opposite configuration, whereby items are picked up at a first location in a close, converged arrangement. The items can then be diverged prior to delivery to a second location.

Figure 7:
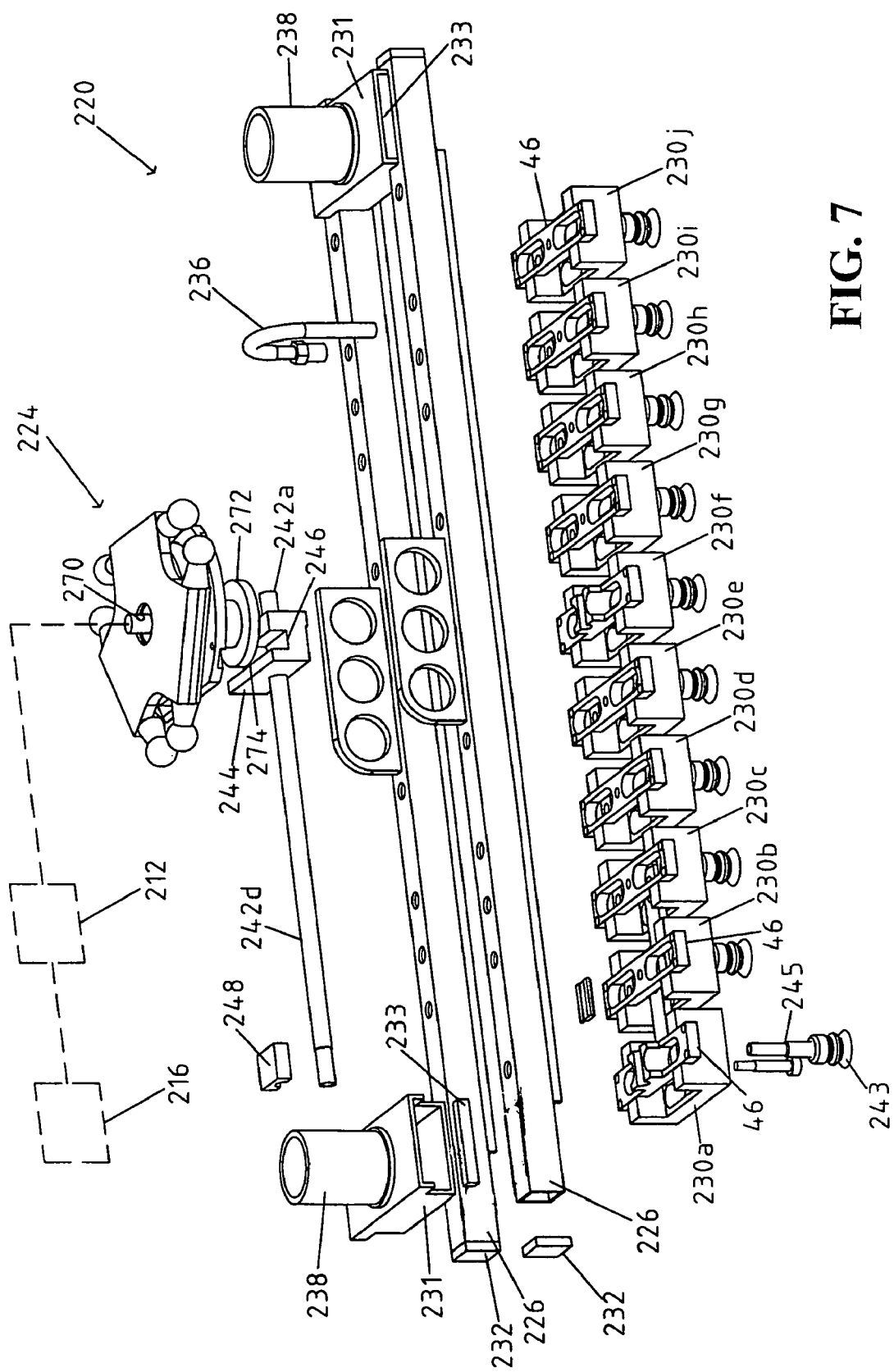
FIG. 7 is an exploded view of an end effector constructed in accordance with a third embodiment of the invention.

FIGS. 7, 8*a* and 8*b* show a third embodiment of an end effector of the present invention, which enables the end effector to pick up several items and then separate those items into discrete groups. This is accomplished by providing an end effector where the pick-up members mounted for moving items into discrete groups. Each group can then, for example, be simultaneously deposited into separate destination receptacles. This allows for more efficient and controlled packaging of the items. To provide an end effector with pick-up members that can divide items into discrete groups, a modified implementation of the actuation mechanism described in the second embodiment is employed, but the end effector is otherwise substantially the same as the end effector of FIGS. 5*a*-5*c*.

End effector 220, shown substantially dismantled in FIGS. 7 and 8*a*, has spaced, pipe members 226 with end flange assemblies 231 secured thereto and vacuum connection tubes 238. Carrier members 230*a*-230*j* are mounted to rails attached to pipe members 226 as described above.

Unlike the actuation mechanism used in conjunction with the second embodiment, the actuation mechanism of the third embodiment of the end effector 220, comprises of a single cam block 244. Cam block 244 is a rectangular block, may in some embodiments be made of a suitable plastic such as for example, polyethylene, or another light but durable material, in which a single cam slot 246 is cut out of, or formed in, the top part of the block along the entire width of the block. The width of the slot preferably approximates the diameter of a circular cam follower 274 protruding from the bottom surface of rotary cam 272. This allows the cam follower to fit inside the slot, and to press against the walls of the slot as soon as the rotary cam starts rotating clockwise or counter-clockwise, thereby pushing the cam block in either direction of the longitudinal axis of the end effector. Specifically, with reference to FIGS. 8*a*, 8*b*, when the carriers 230*a*-230*j* are in the diverged position shown in FIG. 8*a*, and then when rotary cam 272 is rotated clockwise, the cam follower presses against the wall on the right-hand side of the slot, and causes the cam block 244 to move to the right. On the other hand, when the rotary cam rotates counterclockwise, (or if the cam follower is rotated past 180 degrees) the cam follower 274 presses against the wall on the left-hand side of the slot 246, and accordingly causes the cam block to move to the left.

It should be noted that in this embodiment the rotary cam 272 can be operated in only one direction (i.e. clockwise or counterclockwise) through the full 360° to achieve the full cycle of convergence-divergence-convergence or divergence-convergence-divergence of the carrier members.

A long push rod 242*d* is positioned between pipes 226 and is attached to one side of the cam block. A short rod 242*a* is also positioned between pipes 226 and attached on the other side of cam block 244. Both rods 242*a*, 242*d* move in the same direction as cam block 244 moves. It should be noted that rotary cam 272, used in conjunction with end effector 220, consists of only one cam follower, in contrast to cam rotary 172 used In conjunction with end effector 120 which has two cam followers that each simultaneously engage one of the two cam blocks.

FIGS. 8*a* and 8*b* shows the implementation and operation of the third embodiment of the present invention whereby the ten pick-up members or carriers mounted on the end effector 220 can be separated into two groups, each consisting of five pick-up members. As can be seen in FIG. 8*a* and 8*b*, pick-up member 230*a* is clamped to rod 242*d*, while pick-up member 230*f* is clamped to rod 242*a*. To effect a separation of the pick-up members into two groups, pick-up member 230*e* and pick-up member 230*j* have to be fixed to the end effector, preferably by securing those two pick-up members to guide rails 158 or to the hollow pipes 226 using screws, in a manner described above. Pick-up members 230a-230e are interlinked to each other by placing tie links 50 around the hex-head shoulder screws of adjacent pick-up members, as described above. Pick-up member 230e, however, is not linked to pick-up member 230f. Similarly pick-up members 230f-230j are inter-linked to each other using tie links 50, in a manner as described above. As will be appreciated, fixing pick-up members 230e and 230j to the end effector also serves to constrain the maximum outwardly extension of rods 242d and 242b. Since pick-up member 230e is inter-linked to pick-up member 230a, pick-up member 230a can only be moved to a maximum distance equivalent to the length permitted by 4 tie links 50 from pick-up member 230e. Similarly, since pick-up member 230j is inter-linked to pick-up member 230f, pick-up member 230f can only be moved to a distance equivalent to the length permitted by 4 tie links 50 from pick-up member 230j.

As shown in FIG. 8a, the pick-up members 230 are positioned in their expanded state. When the rotary cam 272 is subsequently rotated counter-clockwise, as is shown in FIG. 8b, the cam block 244 is pushed to the right. Consequently, pushing rod 242d starts moving to the right, pushing in the process the pick-up members 230a-230e linked to it. However, because pick-up member 230e is fixed to the end effector, pick-up members 230a-230e converge to each other, thus forming a single group of five pick-up members 230a-230e. Similarly, pushing rod 242a is also pushed to the right, causing the pick-up member 230f, to which the pushing rod 242a is clamped, to also move to the right. In the process, pick-up members 230g-230i are also pushed to the right. Because pick-up member 230j is fixed to the frame of the end effector (such as to pipes 226), the pick-up members 230f-230j converge into a second group of pick-up members.

It will be appreciated that if it desirable to separate the pick-up members into other size groups, for example five groups consisting each of two pick-up members, then it is necessary to clamp pick-up members 230a, 230c, 230e, 2309, and 230i to one of pushing rods 242d or 242a, and fix pick-up members 230b, 230d, 230f, 230h, and 230j to the frame of end effector 220 (such as pipes 226).

In operation, the control system controlling the Delta robot positions the end effector 220 coupled to the moving member 224 above the items that are to be picked up. Optionally, a sensory system may be used to determine the exact locations of the items on the conveyor belt or other platform on the packaging system, so that the end effector could be positioned accordingly. The rotary cam 272 is then rotated clockwise to move the pick-up members into their expanded position shown in FIG. 8a. Rotation of the rotary cam 272 is effected by a rotatable shaft (not shown) extending from the Delta robot and inserted into through aperture 270 on moving member 224. The pick-up members 230a-230j are extended until they are situated directly above the items that are to be picked-up. Subsequently, the end effector 220 is lowered so that the suction cups 243 attached to the C-carrier guide of each of the pick-up members 230a-230j touch the items to be packaged. The extraneous vacuum source—interconnected to the suction cups 243 through the cylindrical pipes 238, the hollow pipes 226, the plug pipes 134, the flexible hoses 236 and the hollow tubes 45—is engaged, thereby creating a suction force at suction cups 243, which causes the items to be lifted off and held by the suction cups.

The Delta robot next moves the end effector 220 in the direction of the destination receptacles where the items are to be deposited. The position of the end effector 220 is controlled by the non-jointed arm section of the Delta robot. Preferably, while the end effector is en-route to the destination receptacles, the control mechanism of rotary cam 272 begins to rotate the rotary cam counter-clockwise, thereby causing the push rods 242a and 242b to move to the right. This in turn causes the pick-up members 230a-230e to converge into one group of pick-up members, and converge pick-up members 230f-230j into another group of pick-up members.

Once the end effector 220 reaches a position directly above the two destination receptacles, the end effector is lowered until the items lifted by one group of pick-up members are placed inside one destination receptacle, while the other items lifted by the other group of pick-up members are placed inside the other destination receptacle. Subsequently, the vacuum source is cut off, thereby releasing the articles from the grip of the suction cups 243. The end effector is then raised above the top opening of the receptacles, and is repositioned by the Delta robot to pick-up the next batch of items to be packaged.

Figure 9:
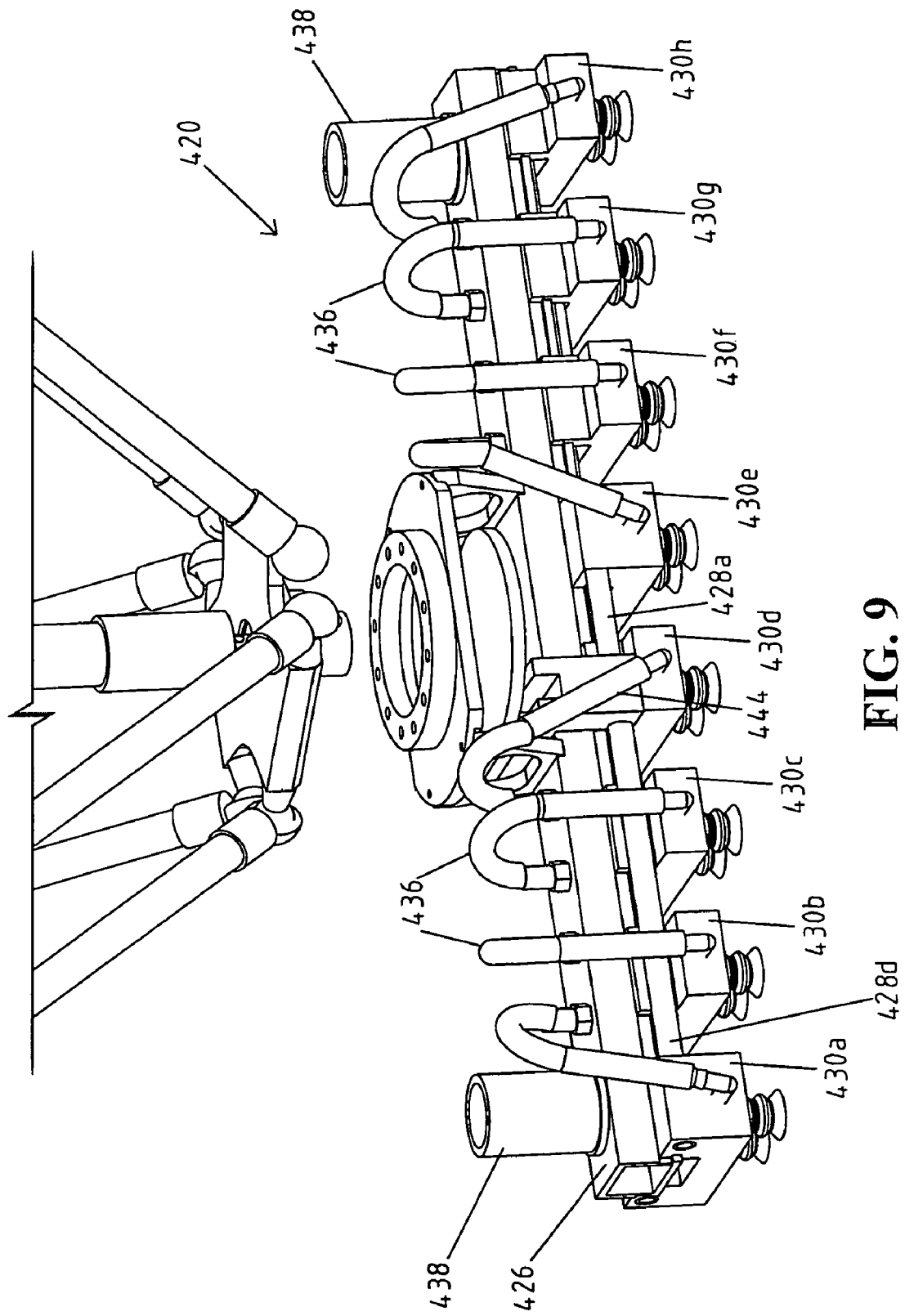
FIG. 9 is top perspective view of an end effector in accordance with a fourth embodiment of the invention.
Figure 10:
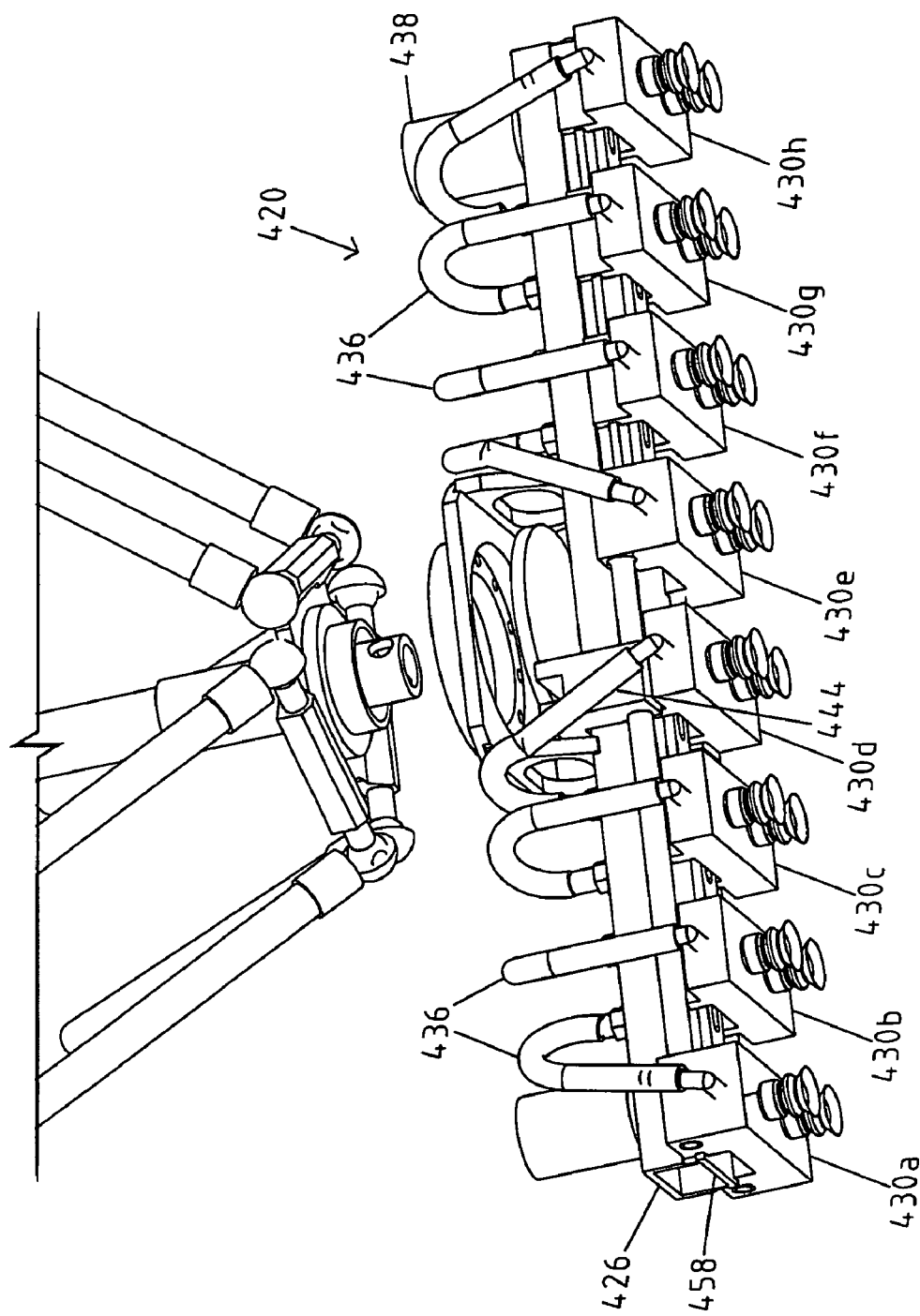
FIG. 10 is a bottom perspective view of the end effector of FIG. 9.

In FIGS. 9 and 10, an end effector 420 that is a variation of the embodiment of FIGS. 7-8b is shown, along with the arms from a robot arm. In this embodiment, an end effector 420 is constructed like end effector 220 but is made with only a single central pipe member 426. Pipe member 426 has a single rail 458 extending along its lower face and a total of eight pick up members 430 with suction cups 423 are secured for sliding movement thereon. Vacuum is supplied through pipes 438 to sealed pipe 426, through hoses 436 into carriers 430 and suction cups 423. Pick up members 430a, 430e, 430f and 430j are configured like 230a, 230e, 230f and 230j in FIGS. 8a, 8b and are interconnected with carriers 430b, 430c, 4309, 430j, to effect movement that is the same as in that embodiment of FIGS. 8a and 8b. In the embodiment of FIGS. 9 and 10, rods 428d, and 428a connected to cam block 444 are provided on both sides of pipe 426 to ensure free sliding of pick up members 430 on rails 458.

Figure 11:
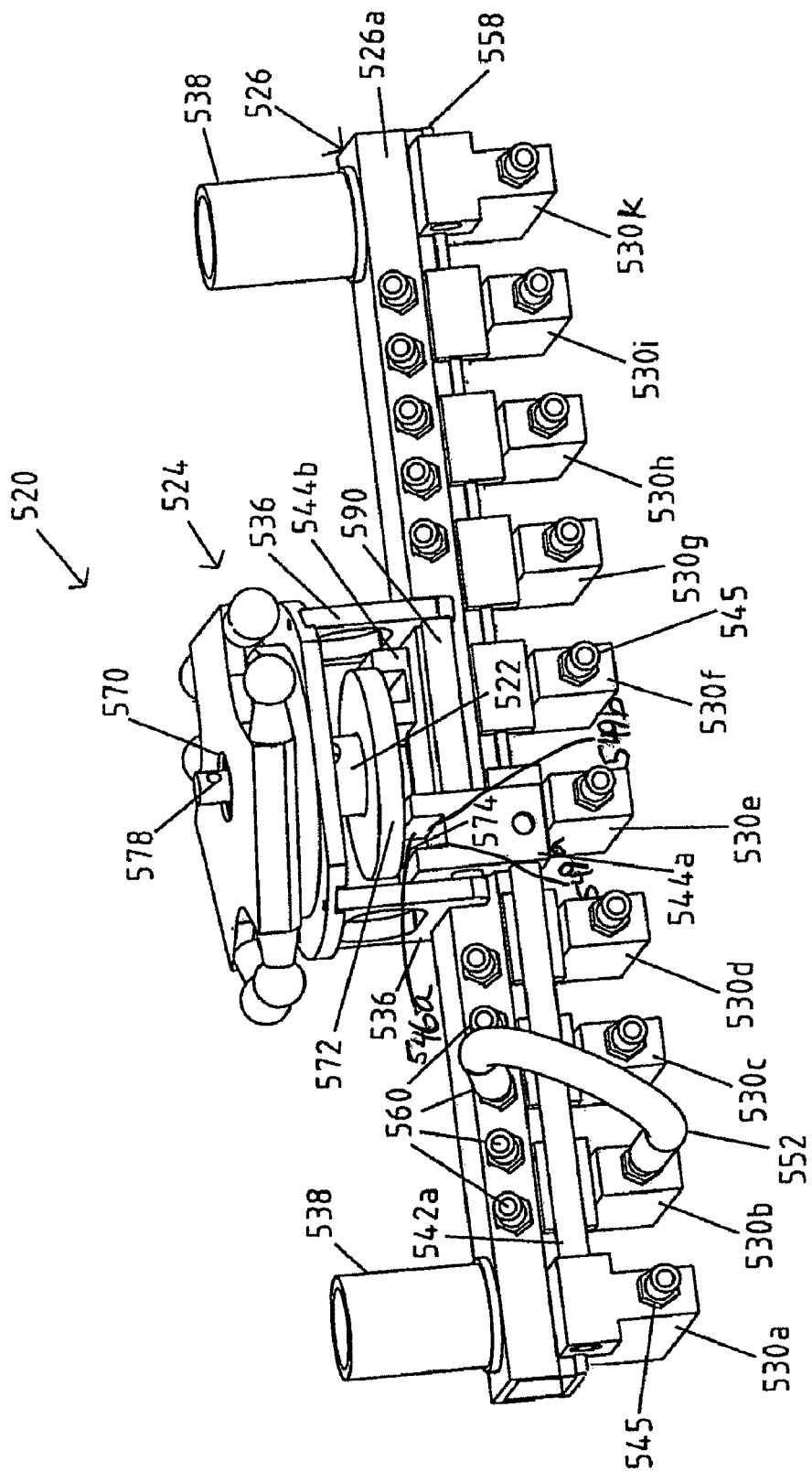
FIG. 11 is top perspective view of an end effector in accordance with a fourth embodiment of the invention

Finally, another embodiment is shown in FIG. 11 in which an end effector generally designated 520 is illustrated. Although not shown in FIG. 11 in use end effector 520 is secured to a moving device such as the end of a robotic arm. End effector 520 is formed with a frame structure, to which a plurality of pick up members 530a-k are movably attached as described above. In this embodiment, the frame is made from a single, hollow rectangular pipe member 526. As with the other embodiments, the pipe 526 and hub assembly 622 are preferably made of a lightweight but durable material such as aluminum, or carbon fiber composites, or similar light composites. Pipe 526 is sealed at its ends with closed plugs (not shown) such that the only openings to the interior of the pipes are those openings which are connected to vacuum hoses with connectors 560, and end pipes 538.

The overall path of vacuum air flow through end effector 520 is from the suction cups (not shown), through the carrier members 530, via connectors 545 into hoses 552, through side connectors 560 on side 526a of pipe. The positioning of hoses 552 can reduce the wear that the hoses might encounter when during movement of the effector, they interact or rub against other parts of the robot arm. From pipe 526 air is drawn through pipes 538 to the external vacuum source.

The hub assembly 522 is mounted with transversely oriented side plates 336 to pipe 526, proximate the middle of the pipe 526. Like the other components from which end effector 520 is assembled, side plates 536 are preferably made of light but durable materials such as aluminum.

Extending between and secured at ends to, plates 536 on both sides of pipe 526, are cam block support rods 590. Each rod 590 supports one of cam blocks 544a, 544b for sliding longitudinal movement thereon. Thus, cam blocks 544a, 544b form two parts of one actuation device. Cam block 544a has secured to it, one end of cam rod 542a, which is attached at its other end, to carrier 530a. Cam block 544b has secured to it, one end of cam rod (not shown but which is the same as rod 542a) which is attached at its other end, to carrier 530k.

Rotary cam disc 572, forming a second actuation device, which is generally mounted and driven as described above and being interconnected to a rotating power source with shaft 578. As described above, rotary cam 572 can be mounted to a moving connector member 524 of a Delta robot. Disc 572 has a pair of cam followers (engagement members) 574 positioned 180 degrees apart on the periphery of the disc 572, each engaging one of the cam blocks 544. Similar to the embodiment above, cam block 544a has a transverse slot 546a with opposing side surfaces 549a, 549b. Cam block 544b is constructed in a similar manner.

To control and facilitate the movement of the pick-up members 530, all the pick-up members 530a-k are interconnected in a chain like manner as described above with tie links. All members 530a-k are free to move along the guide rail 558, but it should particularly noted that centrally located carriers 530e and 530f will have their movement in an outward direction constrained by the tie link between them, and their inward movement by the tie link or the actual carrier themselves.

Control of the movement of the pick-up members 530 is achieved by directly controlling the movement of pick-up members 530a and 530k using the actuation mechanism comprising the rotary disc 572, cam followers 574, cam blocks 544 and rods 542.

In FIG. 11, carriers 530 are shown in the diverged configuration with cam followers 574 in the approximately 3 o'clock and 9 o'clock position. By rotating cam disc 572 about 180 degrees or perhaps slightly less, in a counter clockwise direction from the position shown in FIG. 11, cam blocks 544 will be moved toward and past the center of pipe 526, thus pulling carrier members 530a and 530k to converge with other carrier members in the chain toward fixed carrier members 530e, 530f, and toward a central position, in a manner like that described above. When fully converged, all carrier members 530a-k can be in abutment with each other. Alternatively, the inward movement can be constrained by the configuration of the tie links. By reversing the direction of movement of cam disc 572 to rotate about 180 degrees in a clockwise direction the carrier members can be returned to the diverged position shown in FIG. 11.

These and other modifications and variations will readily become apparent to those of ordinary skill in the art without departing from the scope of the invention. For example, although in the embodiments shown herein, tie links between carriers are shown each of the same configuration, it is possible to vary the configuration of some of the tie links so that there are different configurations used. This could provide for non-constant spacing between the carrier members in the converged and/or diverged positions.

I claim:

1. An end effector for use with a moving device, said end effector comprising:
   a) a frame;
   b) a plurality of operational members configured for longitudinal movement on said frame;
   c) an actuation mechanism connected to a first operational member of said plurality of operational members and configured and operable to move said first operational member from a first position to a second position;
   d) a linking apparatus for linking said first operational member to a second operational member of said plurality of operational members said second operational member not directly connected to said actuation mechanism;
   said actuation mechanism being configured and operable to move said first operational member from said first position to said second position, such that said second operational member is operable to be moved by said linking apparatus from a third position to a fourth position;
   and wherein said actuation mechanism comprises:
      i) at least one cam block having a cam slot in an upper surface of said at least one cam block said cam slot extending in a generally transverse direction that is generally orthogonal to the direction of longitudinal movement, said at least one cam block also being configured for longitudinal movement relative to said frame;
      ii) a generally longitudinally oriented member attached to and extending between said at least one cam block and said first operational member;
      iii) a rotary cam configured and operable for rotation about an axis that is generally orthogonal to said direction of longitudinal movement and said transverse direction, said rotary cam being configured for connection to a rotatable drive shaft that is also rotatable generally about said axis; said rotary cam having at least one cam follower protruding from said rotary cam, wherein said at least one cam follower is configured and operable for movement transversely inside said cam slot of said at least one cam block and thus is operable to move said at least one cam block in a longitudinal direction during rotation of said rotary cam.

2. An end effector as claimed in claim 1 wherein said actuation mechanism is directly connected to a third operational member of said plurality of operational members and is configured and operable to move said third operational member from a fifth position to a sixth position, and from said sixth position to said fifth position, said linking apparatus also for linking said third operational member to a fourth operational member of said plurality of operational members;
   and wherein when said actuation mechanism is configured and operable to move said third operational member from said fifth position to said sixth position, such that said fourth operational member is operable to be moved by said linking apparatus from a seventh position to an eighth position;
   and wherein said at least one cam block comprises:
   a) a first cam block having a first cam slot in an upper surface of said first cam block extending generally in said transverse direction across said upper surface of said first cam block, said first cam block being configured for longitudinal movement relative to said frame;
   b) a second cam block having a second cam slot in an upper surface of said second cam block, said second cam slot extending generally in said transverse direction across said upper surface of said second cam block, said second cam block being positioned in parallel longitudinal relation to said first cam block and being configured for longitudinal movement relative to said frame;
   and wherein said actuation mechanism further comprises:
      i) a first rod attached to said first cam block and to said first operational member;
      ii) a second rod attached to said second cam block and said third operational member;
      iii) and wherein said at least one cam follower protruding from said rotary cam comprises: (A) a first cam follower and wherein said first cam follower is configured and operable to move transversely inside said first cam slot of said first cam block and thus is operable to push said first cam block in a first direction during rotation of said rotary cam in a first rotational direction, and (B) a second cam follower, wherein said second cam follower is configured and operable to move transversely inside said second cam slot of said second cam block and thus is operable to push said second cam block in a direction opposite to said first direction during rotation of said rotary cam in said first rotational direction about said axis.

3. An end effector as claimed in claim 2 wherein said actuation mechanism is configured and operable to move said first operational member from said second position to said first position, such that said second operational member is operable be moved by said linking apparatus from said fourth position to said third position.

4. An end effector as claimed in claim 2 wherein said linking apparatus is configured such that when said first operational member is at said first position and said second operational member is at said third position, the spacing between said first and second operational members is less than said spacing when said first operational member is at said second position and said second operational member is at said fourth position.

5. An end effector as claimed in claim 4 further comprising a fifth operational member, said fifth operational member being not directly connected to said actuation mechanism, said fifth operational member being linked by said linking apparatus to said second operational member, said actuation mechanism being configured and operable to move said first operational member from said first position to said second position, such that said second operational member is operable to be moved by said linking apparatus from a third position to a fourth position, and said fifth operational member is operable to be moved by said linking apparatus from a ninth position to a tenth position, and wherein said actuation mechanism is configured and operable to move said first operational member from said second position to said first position, said second operational member is operable to be moved from said fourth position to said third position, and said fifth operational member may be moved from said tenth position to said ninth position.

6. An end effector as claimed in claim 2 wherein said first, second, third, and fourth operational members are pick up members is operable to pick up and release at least one item.

7. An end effector as claimed in claim 6 further comprising a vacuum source that is interconnected and is operable to provide vacuum to said first, second, third and fourth pick-up members, wherein said vacuum source creates a suction force at a suction location on each of said first, second, third and fourth pick-up members, to lift and hold said at least one item.

8. An end effector as claimed in claim 1 wherein said rotatable shaft associated with said end effector is operable for driving said rotary cam about said axis, and a motor configured and operable to drive said rotatable shaft.

9. An end effector as claimed in claim 8 further comprising a controller associated with said moving device operable for controlling the motor and thus the rotation of said rotatable drive shaft.

10. An apparatus for moving a plurality of items comprising:
a) a frame;
b) a plurality of operational members mounted to said frame for movement generally in a longitudinal direction on said frame;
c) an actuation mechanism mounted to said frame and connected to a first operational member of said plurality of operational members and configured and operable to move said first operational member longitudinally from a first position to a second position, and from said second position to said first position;
d) a linking apparatus for linking longitudinally said first operational member to a second operational member of said plurality of operational members, said second operational member being not directly connected to said actuation mechanism;
wherein said actuation mechanism comprises
  i) at least one cam block having a cam slot in an upper surface of said at least one cam block said cam slot extending in a generally transverse direction that is generally orthogonal to the direction of longitudinal movement and across said upper surface of said at least one cam block, said at least one cam block also being configured for longitudinal movement relative to said frame;
  ii) a connector connecting said at least one cam block and said first operational member;
  iii) a rotary cam configured and operable for rotation about an axis that is generally orthogonal to said direction of longitudinal movement and said transverse direction, said rotary cam having at least one cam follower protruding from said rotary cam, wherein said at least one cam follower is configured and operable to move transversely inside said cam slot of said at least one cam block and thus is operable to move said at least one cam block in said longitudinal direction during rotation of said rotary cam;
said rotary cam being configured for connection to a rotatable drive shaft that is also rotatable generally about said axis;
said rotary cam being configured and operable to rotate and thereby cause movement of said actuation mechanism and said actuation mechanism being configured and operable to move said first operational member longitudinally from said first position to said second position, such that said second operational member may be moved in said direction of longitudinal movement by said linking apparatus from a third position to a fourth position.

11. The apparatus of claim 10 wherein said apparatus comprises a robot having a robot arm, wherein said robot arm comprises a drive mechanism proximate to a distal end of said robot arm, said drive mechanism comprising said rotatable drive shaft operable for driving said rotary cam.

12. A robot as claimed in claim 10 wherein the rotatable shaft is operable for driving said rotary cam about said axis, and further comprising a motor operable for driving said rotatable shaft.

13. robot as claimed in claim 12 further comprising a controller for controlling the motor and thus the rotation of said rotatable shaft.

14. A robot as claimed in claim 12 further comprising a robot arm, said robot arm having a distal end of said robot arm from which protrudes said rotatable shaft.

15. A moving apparatus comprising:
a. frame;
b. an operational member configured for movement generally in a longitudinal direction relative to said frame;
c. an actuator configured and operable to move said operational member from a first position to a second position, and wherein said actuator comprises:

i) at least one cam block having a cam slot extending in a generally transverse direction that is generally orthogonal to said longitudinal direction, said at least one cam block also being mounted for movement in said longitudinal direction relative to said frame;

ii) a connector connecting said at least one cam block to said operational member;

iii) a rotary cam configured and operable for rotation about an axis that is generally orthogonal to said longitudinal direction and said transverse direction;

said rotary cam being configured for connection to a rotatable drive shaft that is also operable for rotation generally about said axis;

said rotary cam having at least one cam member, wherein said at least one cam member is configured and operable to move generally transversely inside said cam slot of said at least one cam block and thus said rotary cam is operable to move said at least one cam block generally in said longitudinal direction during rotation of said rotary cam, and thereby, due to said connector connecting said at least one cam block to said operational member, said rotary cam is operable to move said operational member generally in said longitudinal direction relative to said frame.

16. A moving apparatus as claimed in claim 15 wherein said operational member comprises a first operational member and wherein said apparatus further comprises (a) a second operational member configured for generally longitudinal movement relative to said frame and (b) a linking mechanism interconnecting said first and second operational members, said moving apparatus being configured and operable such that said cam member is operable to move said first operational member generally in said longitudinal direction and thereby, due to said linking mechanism, said cam member is operable to move said second operational member generally in said longitudinal direction.

17. A moving device as claimed in claim 15 wherein said at least one cam block comprises:

a first cam block having a first cam slot in an upper surface of said first cam block extending generally in said transverse direction across said upper surface of said first cam block, said first cam block being configured for longitudinal movement relative to said frame;

a second cam block having a second cam slot in an upper surface of said second cam block extending generally in said transverse direction across said upper surface of said second cam block, said second cam block being positioned in parallel longitudinal relation to said first cam block and being configured for longitudinal movement relative to said frame;

and wherein said actuation mechanism further comprises:
a first connection mechanism interconnecting said first cam block and said first operational member;
a second connection mechanism interconnecting said second cam block and a second operational member;

and wherein said at least one cam member comprises: (A) a first cam member configured and operable to move generally transversely inside said first cam slot of said first cam block and thereby be operable to push said first cam block generally in a first direction during rotation of said rotary cam in a first rotational direction, and (B) a second cam member configured and operable to move generally transversely inside said second cam slot of said second cam block and thereby be operable to push said second cam block in a direction opposite to said first direction during rotation of said rotary cam in said first rotational direction about said axis.

18. A robot as claimed in claim 15 the rotatable shaft is configured and operable for driving said rotary cam about said axis, and a motor associated configured and operable to drive said rotatable shaft.

19. A robot as claimed in claim 18 further comprising a controller is operable for controlling the motor and thus the rotation of said rotatable drive shaft.

20. A robot as claimed in claim 15 comprising first and second operational members configured for movement on said frame generally in said longitudinal direction relative to said frame, and an operational member interconnection mechanism interconnecting said first and second operational members, said actuator being configured and operable to move said first operational member from said first position to said second position, such that in co-operation with said first operational member and said operational member interconnection mechanism, said second operational member is operable to be moved by said operational member interconnection mechanism from a third position to a fourth position.

21. An end effector as claimed in claim 20 wherein said operational member interconnection mechanism is configured such that when said first operational member is at said first position and said second operational member is at said third position, the spacing between said first and second operational members is less than said spacing when said first operational member is at said second position and said second operational member is at said fourth position.

22. A method for lifting and transferring an item from a first location to a receptacle, said method comprising:

a) moving a robot to position an end effector of a robot above said item;

b) moving a first operational member of said end effector that is movable generally longitudinally using an actuator to a position directly above said item;

c) lowering said end effector so that first operational member can pick up said item;

d) raising said end effector;

e) moving said robot to reposition said end effector above a receptacle;

f) moving said first operational member with said actuator;

g) moving said end effector toward said receptacle so that said item may be loaded inside said receptacle;

h) releasing said item from said first operational member to load said receptacle with said item;

and wherein said end effector comprises:

I) a frame;

II) a first operational member configured for movement relative to said frame generally in a first direction;

III) an actuator operable to move said first operational member generally in said first direction from a first position to a second position;

wherein said actuator comprises:

i) a cam device having a cam surface oriented generally in a transverse direction that is orthogonal to said first direction, said cam device being configured for movement relative to said frame generally in said first direction;

ii) a connector connecting said cam device to said operational member;

iii) a rotary device configured to rotate about an axis of the rotary device and said rotary device being configured for connection to a rotatable drive shaft;

said rotatable drive shaft being operable to rotate about a shaft axis;

said shaft axis being configured generally orthogonal to said transverse direction and said first direction;
said rotary device having at least one moving element;
said rotary device being operable to be driven to rotate about said axis of said rotary device by rotation of said rotatable drive shaft such that:
said at least one moving element is moved generally against and along said cam surface of said cam device to move said cam device generally in said first direction; and
due to said connector connecting said operational member to said cam device, said at least one moving element is also operable to move said operational member generally in said first direction from said first position to said second position.

23. A moving apparatus comprising:
a frame;
an operational member configured for movement generally in a first direction relative to said frame;
an actuator operable to move said operational member from a first position to a second position relative to said frame, and wherein said actuator comprises:
a) a first actuation device being configured and operable for movement generally in said first direction relative to said frame;
b) a second actuation device being configured and operable for rotation about an axis that is generally orthogonal to said first direction; said second actuation device being configured for connection to a rotatable drive shaft that is also operable for rotation generally about said axis;
a connector connecting said actuator to said operational member;
said second actuation device being configured and operable to rotate about said axis to move said first actuation mechanism said first direction, resulting in movement of said operational member; and wherein:
one of said first actuation device and said second actuation device comprises a cam surface oriented generally in a transverse direction;
the other of said first actuation device and said second actuation device comprises an engagement element operable to engage said cam surface during rotation of said second actuation device about said axis;
wherein said axis is generally orthogonal to both said first direction and said transverse direction, and said transverse direction is also generally orthogonal to the first direction;
said second actuation device being operable to be driven to rotate about said axis such that:
said engagement element is operable to move generally along said cam surface to move said first actuation device generally in said first direction; and
due to said connector connecting said operational member to said actuator, said engagement element is also operable to move said operational member generally in said first direction from said first position to said second position.

24. An apparatus as claimed in claim 23 wherein apparatus comprises a robot and an end effector mounted to said robot and wherein said first actuation device is configured as part of said end effector and wherein said robot comprises at least part of said second actuation device.

25. An apparatus as claimed in claim 24 wherein said robot has a robot arm and wherein the rotatable drive shaft extends from said robot arm, said rotatable drive shaft being configured and operable for rotation such that said first actuation device is operable to be moved in said first direction.

26. An apparatus as claimed in claim 23 wherein said connector connects said first actuation device directly to said operational member.

27. An apparatus as claimed in claim 26 wherein said first actuation device comprises at least one cam block having at least one transversely oriented slot to provide said surface, and wherein said second actuation device further comprises a rotary device interconnected to said rotatable shaft to engage said surface of said transversely oriented slot.

28. A moving apparatus as claimed in claim 23 wherein the rotatable drive shaft is configured and operable for driving said rotary cam about said axis, and further comprising a motor configured and operable to drive said rotatable shaft.

29. A moving apparatus as claimed in claim 28 further comprising a controller operable for controlling the motor and thus the rotation of said rotatable shaft.

30. A moving apparatus as claimed in claim 29 comprising first and second operational members configured for movement on said frame generally in said longitudinal direction and an operational member interconnection mechanism interconnecting said first and second operational members, said actuator being configured and operable to move said first operational member from said first position to said second position, such that in co-operation with said first operational member and said operational member interconnection mechanism, said second operational member is operable to be moved by said interconnection mechanism from a third position to a fourth position.

31. A moving apparatus as claimed in claim 30 wherein said operational member interconnection mechanism is configured such that when said first operational member is at said first position and said second operational member is at said third position, the spacing between said first and second operational members is less than said spacing when said first operational member is at said second position and said second operational member is at said fourth position.

32. A moving apparatus comprising:
i) a frame;
ii) an operational member configured for movement relative to said frame generally in a first direction;
iii) an actuator operable to move said operational member generally in said first direction from a first position to a second position;
said actuator comprising:
a) a cam device having a cam surface oriented generally in a transverse direction that is orthogonal to said first direction, said cam device being configured for movement relative to said frame generally in said first direction;
b) a connector connecting said cam device to said operational member;
c) a rotary device configured to rotate about an axis of the rotary device and said rotary device being configured for connection to a rotatable drive shaft;
said rotatable drive shaft being operable to rotate about a shaft axis;
said shaft axis being configured generally orthogonal to said transverse direction and said first direction;
said rotary device having at least one moving element;
said rotary device being operable to be driven to rotate about said axis of said rotary device by rotation of said rotatable drive shaft such that:
said at least one moving element is operable to move generally against and along said cam surface of said cam device to move said cam device generally in said first direction; and due to said connector connecting said operational member to said cam device, said at least one moving element is also operable to move said operational member generally in said first direction from said first position to said second position.

33. A moving apparatus as claimed in claim 32 comprising first and second operational members configured for movement on said frame generally in said first direction and further comprising an operational member interconnection mechanism interconnecting said first and second operational members, said actuation mechanism being configured and operable to move said first operational member from said first position to said second position, such that in co-operation with said first operational member and said operational member interconnection mechanism, said second operational member is operable to be moved by said operational member interconnection mechanism from a third position to a fourth position.

34. A moving apparatus as claimed in claim 33 wherein said operational member interconnection mechanism is configured such that when said first operational member is at said first position and said second operational member is at said third position, the spacing between said first and second operational members is less than said spacing when said first operational member is at said second position and said second operational member is at said fourth position.

35. A moving apparatus as claimed in claim 32 wherein said axis of the rotary device and the shaft axis are the same axis.

36. A moving apparatus as claimed in claim 35 wherein said moving apparatus further comprises said rotatable drive shaft that is operable to rotate about said shaft axis wherein said moving apparatus is configured such that said rotary device is operable to be driven in rotation about said axis of said rotary device.

37. A moving apparatus as claimed in claim 36 further comprising a motor operable to drive said rotatable drive shaft.

38. A moving apparatus as claimed in claim 32 wherein said moving element is a sliding element.

39. A moving apparatus as claimed in claim 38 further comprising a controller for controlling the motor and thus the rotation of said rotatable drive shaft.

40. A method for manufacturing a packaged product comprising loading an item into a receptacle using a moving apparatus, said moving apparatus comprising:

I) an end effector having a frame and at least one operational member configured for movement generally in a first direction relative to said frame;

II) an actuator operable to move said operational member generally in said first direction;

and wherein said actuator comprises:

i) a cam device having a cam surface oriented generally in a transverse direction that is orthogonal to said first direction, said cam device being configured for movement relative to said frame generally in said first direction;

ii) a connector connecting said cam device to said operational member;

iii) a rotary device configured to rotate about an axis of the rotary device and said rotary device being configured for connection to a rotatable drive shaft;

said rotatable drive shaft being operable to rotate about a shaft axis;

said shaft axis being configured generally orthogonal to said transverse direction and said first direction;

said rotary device having at least one moving element;

said rotary device being operable to be driven to rotate about said axis of said rotary device by rotation of said rotatable drive shaft such that:

said at least one moving element is operable to move generally against and along said cam surface of said cam device to move said cam device generally in said first direction; and due to said connector connecting said operational member to said cam device, said at least one moving element is also operable to move said operational member generally in said first direction from said first position to said second position, said method comprising:

a) positioning said operational member above an item;

b) using said operational member to pick up said item;

c) raising said item with said operational member;

d) positioning said operational member above a receptacle;

e) releasing said item from said operational member to load said receptacle with said item;

f) during at least one of (a) to (e) above, rotating said rotary device about said axis thereby moving said at least one moving element against said cam surface of said cam device and thus moving said cam device and said operational member in said first direction.

41. A method as claimed in claim 40 wherein said axis of the rotary device and the shaft axis are the same axis.

42. A method as claimed in claim 41 wherein said moving apparatus further comprises said rotatable drive shaft that is operable to rotate about said shaft axis wherein said moving apparatus is configured such said rotary device is operable to be driven in rotation about said axis of said rotary device.

43. A method as claimed in claim 42 wherein said moving element is a sliding element.

44. A method as claimed in claim 42 wherein said moving apparatus further comprises a motor operable to drive said rotatable drive shaft.

45. A method as claimed in claim 44 wherein said moving apparatus further comprises a controller for controlling the motor and thus the rotation of said rotatable drive shaft.

* * * * *